(12) United States Patent
Matsuura et al.

(10) Patent No.: US 11,315,221 B2
(45) Date of Patent: Apr. 26, 2022

(54) APPARATUS AND METHOD FOR IMAGE RECONSTRUCTION USING FEATURE-AWARE DEEP LEARNING

(71) Applicant: CANON MEDICAL SYSTEMS CORPORATION, Otawara (JP)

(72) Inventors: Masakazu Matsuura, Asahikawa (JP); Jian Zhou, Vernon Hills, IL (US); Zhou Yu, Vernon Hills, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/372,174

(22) Filed: Apr. 1, 2019

(65) Prior Publication Data

US 2020/0311878 A1    Oct. 1, 2020

(51) Int. Cl.
*G06K 9/00* (2006.01)
*G06T 5/00* (2006.01)
(Continued)

(52) U.S. Cl.
CPC ............ *G06T 5/002* (2013.01); *G06K 9/6231* (2013.01); *G06K 9/6256* (2013.01); *G06T 5/50* (2013.01);
(Continued)

(58) Field of Classification Search
CPC ......... G06T 5/002; G06T 11/008; G06T 5/50; G06T 2207/20081; G06T 2207/30096;
(Continued)

(56) References Cited

U.S. PATENT DOCUMENTS

2018/0144214 A1\* 5/2018 Hsieh ................. G06N 3/08
2018/0197317 A1  7/2018 Cheng et al.
(Continued)

FOREIGN PATENT DOCUMENTS

EP    3 404 611 A1   11/2018
WO    2018/045274 A1   3/2018

OTHER PUBLICATIONS

Love A. et al, "Six iterative reconstruction algorithms in brain CT: a phantom study on image quality at different radiation dose levels" BRJ British Institute of Radiology 2013; DOI: 10.1259/bjr. 20130388; pp. 1-11.
(Continued)

*Primary Examiner* — Dhaval V Patel
(74) *Attorney, Agent, or Firm* — Oblon, McClelland, Maier & Neustadt, L.L.P.

(57) ABSTRACT

A method and apparatus is provided to perform medical imaging in which feature-aware reconstruction is performed using a neural network. The neural network is trained to perform feature-aware reconstruction by using a training dataset in which the target data has a spatially-dependent degree of denoising and artifact reduction based on the features represented in the image. For example, a target image can be generated by reconstructing multiple images, each using a respective regularization parameter that is optimized for a different anatomy/organ (e.g., abdomen, lung, bone, etc.). And a target image can be generated using artifact reduction method (e.g. metal artifact reduction, aliasing artifact reduction, etc.). Then respective regions/features (e.g., abdomen, lung, and bone, artifact free, regions/features) can be extracted from the corresponding images and combined into a single combined image, which is used as the target data to train the neural network.

27 Claims, 13 Drawing Sheets

(51) Int. Cl.
*G06K 9/62* (2022.01)
*G06T 5/50* (2006.01)
*G06T 11/00* (2006.01)

(52) U.S. Cl.
CPC .. *G06T 11/008* (2013.01); *G06T 2207/10081* (2013.01); *G06T 2207/10088* (2013.01); *G06T 2207/10104* (2013.01); *G06T 2207/10108* (2013.01); *G06T 2207/20081* (2013.01); *G06T 2207/20084* (2013.01); *G06T 2207/30008* (2013.01); *G06T 2207/30061* (2013.01); *G06T 2207/30096* (2013.01)

(58) Field of Classification Search
CPC . G06T 2207/10104; G06T 2207/20084; G06T 2207/10088; G06T 2207/30061; G06T 2207/10108; G06T 2207/30008; G06T 2207/10081; G06K 9/6231; G06K 9/6256
See application file for complete search history.

(56) References Cited

U.S. PATENT DOCUMENTS

| | | | |
|---|---|---|---|
| 2018/0353135 A1* | 12/2018 | Chappo | A61B 5/0456 |
| 2019/0236763 A1 | 8/2019 | Chan et al. | |
| 2020/0065940 A1* | 2/2020 | Tang | G06T 3/40 |
| 2020/0234080 A1* | 7/2020 | Ciller Ruiz | G06N 3/04 |

OTHER PUBLICATIONS

L. L. Geyer, et al, "State of the Art: Iterative CT Reconstruction Techniques" Radiology; vol. 276; Aug. 2015; pp. 338-356.

Yang, Q. et al, "CT Image Denoising with Perceptive Deep Neural Networks" The 14th International Meeting on Fully Three-Dimensional Image Reconstruction in Radiology and Nuclear Medicine; Jun. 2017; DOI: 10.12059/Fully3D.2017-11-3201015; pp. 858-863.

Kang, E. et al, "A deep convolutional neural network using directional wavelets for low-dose X-ray CT reconstruction" Medical Physics 44(10) Oct. 2017; e360-e375; pp. 360-375.

Chen, H et al, "Low-Dose CT With a Residual Encoder-Decoder Convolutional Neural Network" IEEE Trans Medical Imaging 2017; 36(12); pp. 2524-2535.

Ge Wang. "A Perspective on Deep Imaging", IEEE Access, vol. 4, 2016, pp. 8914-8924.

Kuang Gong, et al., "Iterative PET Image Reconstruction Using Convolutional Neural Network Representation", IEEE, Sep. 2018.

Sabrina Dorn, Shuqing Chen, Stefan Sawall, David Simons, Matthias May, Joscha Maier, Michael Knaup, Heinz-Peter Schlemmer, Andreas Maier, Micheal M. Lell, Marc Kachelrieß, "Organ-specific context-sensitive CT image reconstruction and display," Proc. SPIE 10573, Medical Imaging 2018: Physics of Medical Imaging, 1057326 (Mar. 9, 2018); doi: 10.1117/12.2291897, Event: SPIE Medical Imaging, 2018, Houston, Texas, United States.

* cited by examiner

APPARATUS AND METHOD FOR IMAGE RECONSTRUCTION USING FEATURE-AWARE DEEP LEARNING

FIELD

This disclosure relates to reconstruction of medical images in which denoising of the images is performed using a deep-learning network based on feature-aware training, and, more particularly, the denoising and artifact reduction can be performed on medical images including: (i) X-ray computed tomography (CT) images; (ii) positron emission tomography (PET) images; and (iii) magnetic resonance (MR) images.

BACKGROUND

The background description provided herein is for the purpose of generally presenting the context of the disclosure. Work of the presently named inventors, to the extent the work is described in this background section, as well as aspects of the description that cannot otherwise qualify as prior art at the time of filing, are neither expressly nor impliedly admitted as prior art against the present disclosure.

Medical imaging produces images of the internal members of a patient's body. For example, magnetic resonance imaging (MRI) uses radio waves, magnetic fields, and magnetic-field gradients to produce images of the internal members of a patient's body. Medical-imaging modalities also include, for example, X-ray radiography, ultrasonography, computed tomography (CT), and positron emission tomography (PET). Once the images have been produced, a physician can use the images to diagnose a patient's injuries or diseases.

In PET imaging, a tracer agent is introduced into the patient to be imaged via injection, inhalation, or ingestion. After administration, the physical and bio-molecular properties of the agent cause it to concentrate at specific locations in the patient's body. The actual spatial distribution of the agent, the intensity of the region of accumulation of the agent, and the kinetics of the process from administration to its eventual elimination are all factors that may have clinical significance.

During this process, a tracer attached to the agent will emit positrons. When an emitted positron collides with an electron, an annihilation event occurs, wherein the positron and electron are combined. Most of the time, an annihilation event produces two gamma rays (at 511 keV) traveling at substantially 180 degrees apart.

To reconstruct the spatio-temporal distribution of the tracer via tomographic reconstruction principles, each detected event is characterized for its energy (i.e., amount of light generated), its location, and its timing. By detecting the two gamma rays, and drawing a line between their locations, i.e., the line-of-response (LOR), one can determine the likely location of the original disintegration. While this process will only identify a line of possible interaction, by accumulating a large number of those lines, tomographic reconstruction can be used to estimate the original distribution.

As discussed above the LOR for coincidence pairs and the timing information is used to reconstruct a tomographic image of the radioactivity, yielding clinical information. However, this clinical information can often be obscured by noise. Noise can be mitigated to a degree using an iterative reconstruction (IR) algorithm to perform statistical image reconstruction using regularization. A tradeoff, however, exists between reducing noise and introducing other adverse effects into the reconstructed image (e.g., a high degree of regularization can reduce resolution and cause features in the reconstructed image to blur).

Similarly, in X-ray computed tomography (CT), an IR algorithm can be used to reconstruct internals images representing the X-ray attenuation of various organs. In general, lung and air dominant regions will exhibit little attenuation, soft-tissue regions will exhibit more attenuation, and bone regions will exhibit even more attenuation (i.e., radio density). Like in PET imaging, a tradeoff exists between reducing noise and introducing other adverse effects into the reconstructed image such as decreased resolution. The optimal degree of regularization in the reconstructed image can vary from region to region. For example, some regions with larger signals (e.g., lung regions and pone regions) are better served by less regularization and the greater noise that accompanies less regularization in order to maintain higher resolution. On the other hand, some regions with small signal amplitudes (e.g., soft material regions in which little contrast in the attenuation is exhibited between the background and clinically relevant lesions) the increased noise that accompanies less regularization can obscure the features for which a clinician is looking.

Accordingly, improved methods are desired to provide an appropriate amount of denoising on a feature-by-feature basis.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1A:
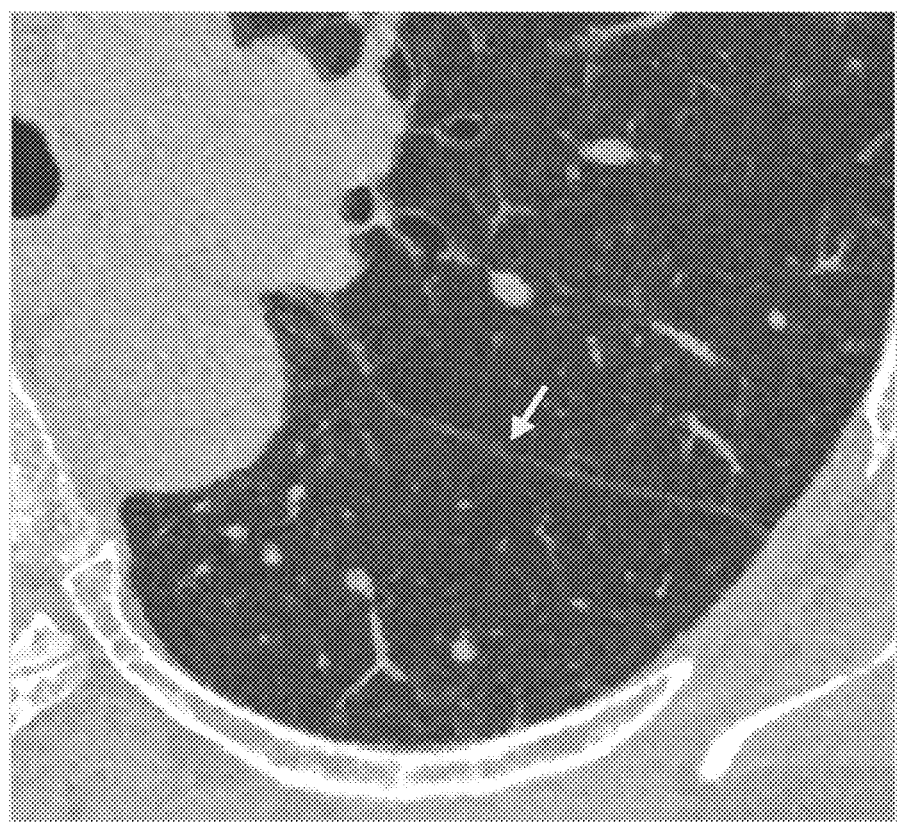
FIG. 1A shows an example of a lung region in a reconstructed computed tomography (CT) image that was generated using a small regularization parameter (i.e., providing a small degree of smoothing/denoising) and that is displayed using lung settings (i.e., the window level is WL=−400 Hounsfield Units (HU) and the window width is WW=1500 HU), according to one implementation.

Computed tomography (CT) systems and methods are widely used, particularly for medical imaging and diagnosis. A CT scan can be performed by positioning a patient on a CT scanner in a space between an X-ray source and X-ray detector, and then taking X-ray projection images through the patient at different angles as the X-ray source and detector are rotated through a scan. The resulting projection data is referred to as a CT sinogram, which represents attenuation through the body as a function of position along one or more axis and as a function of projection angle along another axis. Performing an inverse Radon transform—or any other image reconstruction method—reconstructs an image from the projection data represented in the sinogram.

Various methods can be used to reconstruct CT images from projection data, including filtered back-projection (FBP) and statistical iterative reconstruction (IR) algorithms. Compared to more conventional FBP reconstruction methods, IR methods can provide improved image quality at reduced radiation doses. Various iterative reconstruction (IR) methods exist.

One common IR method performs unconstrained (or constrained) optimization to find the argument p that minimizes the expression $$\underset{p}{\operatorname{argmin}}\{\|Ap - \ell\|_W^2 + \beta U(p)\},$$

wherein $\ell$ is the projection data representing the logarithm of the X-ray intensity of projection images taken at a series of projection angles and p is a reconstructed image of the X-ray attenuation for voxels/volume pixels (or two-dimensional pixels in a two-dimensional reconstructed image) in an image space. For the system matrix A, each matrix value $a_{ij}$ (i being a row index and j being a column index) represents an overlap between the volume corresponding to voxel $p_j$ and the X-ray trajectories corresponding to projection value $\ell_i$. The data-fidelity term $\|Ap - \ell\|_W^2$ is minimized when the forward projection A of the reconstructed image p provides a good approximation to all measured projection images $\ell$. Thus, the data fidelity term is directed to solving the system matrix equation $Ap = \ell$, which expresses the Radon transform (i.e., projections) of various rays from a source through an object OBJ in the space represented by p to X-ray detectors generating the values of $\ell$ (e.g., X-ray projections through the three-dimensional object OBJ onto a two-dimensional projection image $\ell$).

The notation $\|g\|_W^2$ signifies a weighted inner product of the form $g^T W g$, wherein W is the weight matrix (e.g., expressing a reliability of trustworthiness of the projection data based on a pixel-by-pixel signal-to-noise ratio). In other implementations, the weight matrix W can be replaced by an identity matrix. When the weight matrix W is used in the data fidelity term, the above IR method is referred to as a penalized weighted least squares (PLWS) approach.

The function U(p) is a regularization term, and this term is directed at imposing one or more constraints (e.g., a total variation (TV) minimization constraint) which often have the effect of smoothing or denoising the reconstructed image. The value β is a regularization parameter is a value that weights the relative contributions of the data fidelity term and the regularization term.

Consequently, the choice of the value for the regularization term β typically affects a tradeoff between noise and resolution. In general, increasing the regularization term β reduces the noise, but at the cost of also reducing resolution. The best value for the regularization term β can depend on multiple factors, the primary of which is the application for which the reconstructed image is to be reconstructed. Because IR algorithms can be slow and require significant computational resources, a cut-and-try approach is inefficient (e.g., different values of the regularization term β are used for the IR method until an optimal solution is obtained). Moreover, a single CT scan can be used for more than one clinical application, and, therefore, an ability to adjust the reconstructed image with regards the tradeoff between noise and resolution without repeating the computationally intensive IR algorithm is desirable. Thus, improved methods are desired for rapidly generating and modifying a reconstructed image to optimize a tradeoff between noise and resolution.

Another commonly used reconstruction techniques is model-based iterative reconstruction (MBIR). MBIR can provide better image quality than FBP reconstruction methods. Further, deep convolution neural network (DCNN) can improve and speed up various CT imaging applications/image process tasks. The application of DCNN doesn't require accurate pre-designed models such as noise statistics, and instead relies on the availability of a large training dataset. Additionally, a DCNN is capable of capturing exact image features between input and target of training data sets.

The methods provided herein use neural networks, such as a DCNN, to address the above-discussed challenges with regards to optimizing a tradeoff between resolution and noise based on the particular content/context of a displayed image. These methods address the afore-mentioned challenges by training a neural network to perform feature-aware denoising. In certain implementations, this feature-aware denoising can be learned by the network by using training data in which the target images are segmented into various regions corresponding to different features and feature dependent regularization/denoising has been applied to the target images. Thus, by training the neural network using this specially configured training data learns to recognizes certain features, and apply an appropriate degree of denoising in accordance with the recognized features.

Figure 1B:
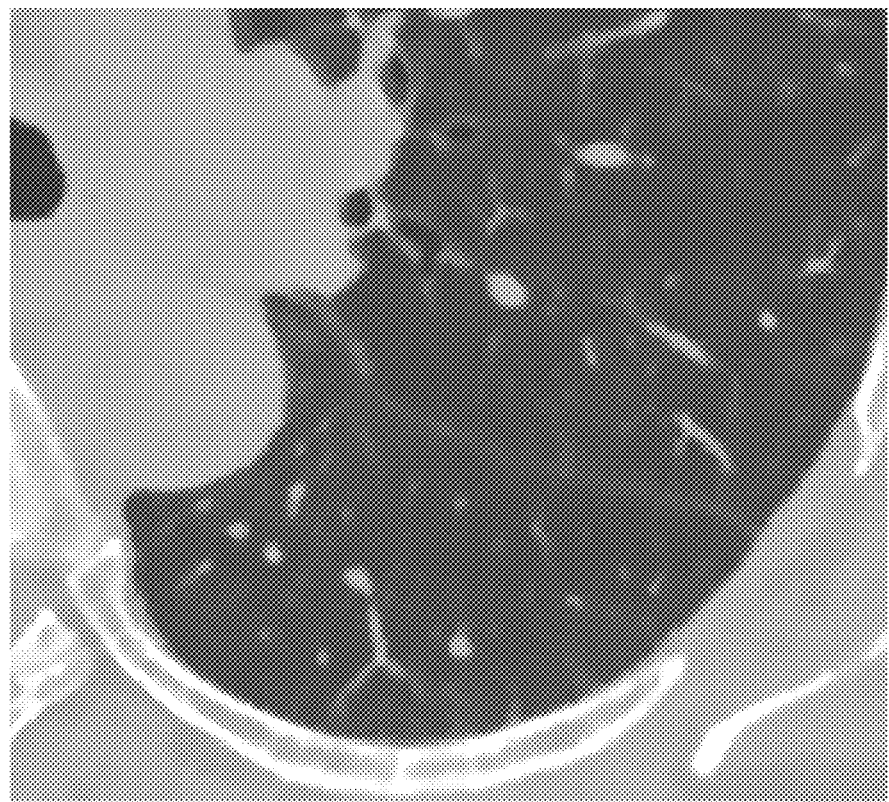
FIG. 1B shows an example of the same lung region using the same display settings as in FIG. 1A, except the CT image was generated using a large regularization parameter rather than the small smoothing/denoising parameter used in FIG. 1A, according to one implementation.
Figure 1C:
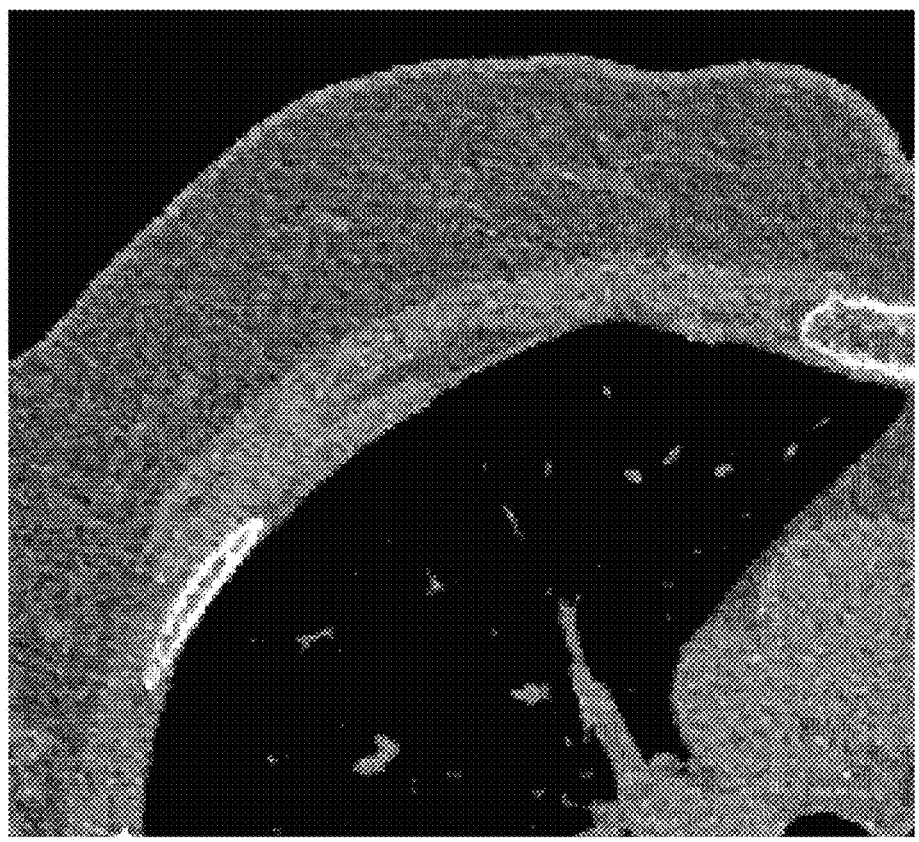
FIG. 1C shows an example of a soft-tissue region in the CT image that was generated using the small regularization parameter and the image is displayed using soft-tissue settings (i.e., WL=40 HU and WW=400 HU), according to one implementation.
Figure 1D:
FIG. 1D shows an example of the same soft-tissue region and soft-tissue display settings as in FIG. 1C, except the CT image was generated using the large regularization parameter, according to one implementation.

Referring now to the drawings, wherein like reference numerals designate identical or corresponding parts throughout the several views, FIGS. 1A and 1B show two images of the same lung region but with different degrees of denoising (which herein is interchangeably referred to as smoothing and in certain contexts regularization). Similarly, FIGS. 1C and 1D show two images of the same soft-tissue region with different degrees of denoising. FIGS. 1A and 1C represent a first degree of denoising, and FIGS. 1B and 1D represent a second degree of denoising with more denoising/smoothing than the first degree of denoising shown in FIGS. 1A and 1C.

In a comparison between FIGS. 1C and 1D, FIG. 1D is generally regarded as being better for clinical applications because the additional resolution in FIG. 1C does not convey significantly more information, but the additional noise in FIG. 1C creates texture and structure that is distracting and could potentially lead to a poor diagnosis or during an interventional procedure a poor outcome. Accordingly, a greater degree of denoising and smoothing can be beneficial for soft-tissue images.

In contrast, a lesser degree of denoising and smoothing can be beneficial for lung images. Herein, the term "smoothing" can be understood as one type of denoising, and, typically, the term "smoothing" can be replaced with the more general term "denoising." In a comparison between FIGS. 1A and 1B, FIG. 1A is generally regarded as being better for clinical applications because the additional resolution in FIG. 1A is significant to being able to distinguish the features of the lungs (e.g., the feature pointed to by the arrow in FIG. 1A), and, compared to the larger widow width in the lung settings and the commensurately higher contrast signals in the lung regions, the additional noise is not as significant as in the small-tissue region. Consequently, the additional noise due to less smoothing obscures relatively little in the lung region, and the disadvantages of the additional noise are outweighed by the advantages of the improved resolution as exhibited in FIG. 1A.

Thus, the optimal degree of denoising can spatially depend on the features within various regions of a reconstructed image. That is different regions within the same image can benefit from different degrees of denoising.

So far, the methods described herein have been illustrated in the context of X-ray CT. However, these methods can also apply to other modalities of medical imaging, including, e.g., positron emission tomography (PET). For example, In PET imaging, feature-aware denoising can also yield improved image quality. For example, statistical iterative reconstruction (IR) algorithm can be used reconstruct a PET image of the tracer/activity density within a patient. The IR algorithm iteratively searches for the reconstructed image that optimizes an objective function, including a data fidelity term and a regularization term. The relative weight between these two terms can affect a trade-off between a higher SNR on the one hand and a finer resolution on the other hand. This tradeoff is often significant because practical limitations (e.g., limitations in injected doses and scan durations) result in low count statistics, degrading the image quality of the PET image due to high noise levels and relatively poor spatial resolution (e.g., 5 to 7 mm resolution). These effects can in turn lead to misdiagnoses and incorrect treatment decisions. Accordingly, methods to improve the quality of PET images are desired.

Accordingly, improved methods are desired to select the degree of regularization that produces optimal reconstructed images. Further, the degree of smoothing that is optimal in one part of the PET image might be sub-optimal in another part of the PET image. Thus, methods that can provide spatially-varying smoothing to locally optimize the quality of the PET image are also desired. In certain implementations, these objectives are achieved by the methods described herein, which generate the target data in the training dataset by using, in the objective function of an IR algorithm, one or more activity-dependent types of regularization and/or activity-dependent parameters in the regularization term.

For example, the quality of PET images can be improved by spatially varying the regularization based on an activity-level mapping that represent respective features within different regions. Here also training data can be used in which the target data has been sub-divided according to regions corresponding to different features and a spatially dependent degree of denoising/regularization has been applied in accordance with the respective features. The variations in the spatially-varying regularization can arise from a spatial dependence of the regularization parameter β that provides the relative weighting between the regularization term and the data fidelity term, as discussed below. Then, a neural network can be trained using the training data in which the target data has been generated using spatially varying regularization/denoising as discussed above. Thus, the neural network is trained to perform feature-aware denoising of the reconstructed PET images.

The regularization parameters, which can be adjusted to affect the degree and/or type of regularization, can be better appreciated by considering the cost function (also referred to as an objective function) to be optimized when solving the reconstruction problem. In PET, the emission data can be configured as a sinogram (similar to projection data in X-ray CT), and, therefore, methods similar to those applied in X-ray CT to reconstruct attenuation images can be applied to reconstruct activity images representing the activity/tracer density as a function of position/voxel index. These reconstruction methods include, e.g., filtered back-projection (FBP) methods and IR methods. Alternatively, the PET emission data can be maintained as a list of individual detection events, rather than being arranged into a sinogram, and the image can be reconstructed using a list-mode based reconstruction method.

In certain implementations using IR reconstruction, the reconstructed image $\hat{x}$ is generated by solving the optimization problem $$\hat{x}(\gamma) = \underset{x \geq 0}{\mathrm{argmax}}\,[L(y\,|\,x) - \beta \phi(x)],$$

wherein y is the measured sinogram, x is the unknown radioactive tracer/activity distribution, L(y|x) is the log likelihood function, ϕ(x) is the regularizer (also referred to as a regularization function or penalty function), and β is the regularization parameter that controls the degree of regularization (also referred to as a penalty strength). In the above objective function, L(y|x) is the data-fidelity term and φ(x) is the regularization term (also known as regularizer). The regularization parameter β provides the relative weight between the data-fidelity regularization and terms. For example, when the regularization term penalizes variations/noise in the reconstructed PET image, increasing the value of the regularization parameter β increases the degree of smoothing, reducing both the noise level and the resolution.

In certain implementations, the regularizer can be a patch-based edge-preserving penalty function, which uses neighboring patches instead of individual pixels to compute the penalty as exemplified by the expression $$\phi(x) = \sum_{j=1}^{N} \sum_{l \in N_j} \gamma_{jl} \psi(|f_j(x) - f_l(x)|),$$

wherein the $\ell$-2 norm or Euclidean distance, which is given by $$|f_j(x) - f_l(x)| = \sqrt{\sum_{k=1}^{n_k} (x_{jk} - x_{lk})^{\wedge}2}$$

can be used the measure of distance between the patches of pixels surrounding pixel j and pixel l, $N_j = \{x_{j1}, x_{j2}, \ldots, x_{1jk}\}$ denotes the neighborhood of pixel j, $\gamma_{jl}$ is the weight related to the distance between pixel j and pixel l, and $\psi(\cdot)$ is the potential function. The regularizer discussed above is straightforward to generalize and can be applied for both pairwise and patch-based penalties, as would be understood by a person of ordinary skill in the art. Other regularizers can be used without departing from the spirit of the methods described herein, as would be understood by a person of ordinary skill in the art.

Similar to the case of X-ray CT discussed above, in PET image reconstruction, increasing the magnitude of the regularization parameter β suppresses noise in the reconstructed image and reduces resolution. Accordingly, regions having lower activity can benefit from a higher degree of smoothing because the count statistics in these regions make them more prone to low SNR (i.e., relatively high noise levels) and fine resolution in these regions is likely not required. For example, higher tracer densities and activity levels are generally found near the region of interest (e.g., due to higher metabolic rates of a lesion). Thus, image reconstruction in which lower activity corresponds to a larger regularization parameter β can be beneficial.

Additionally, where the activity is high a lower regularization parameter β can prevent reduced resolution without sacrificing image quality because the signal is already large compared to the noise. Thus, in these regions of high activity, the SNR can be already sufficiently high without the increased smoothing provided by a large value for the regularization parameter β. Therefore, in certain implementations, the methods described herein use a spatially varying map for the regularization parameter $\beta(\vec{r})$.

Figure 1E:
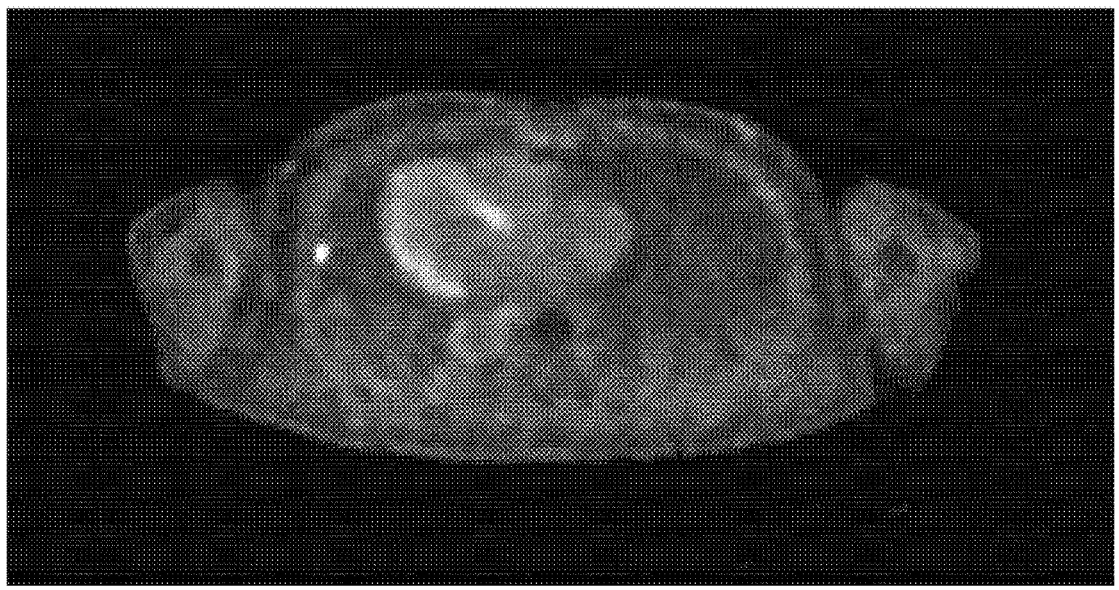
FIG. 1E shows a PET image using spatially-constant regularization with a small smoothing strength, according to one implementation.
Figure 1F:
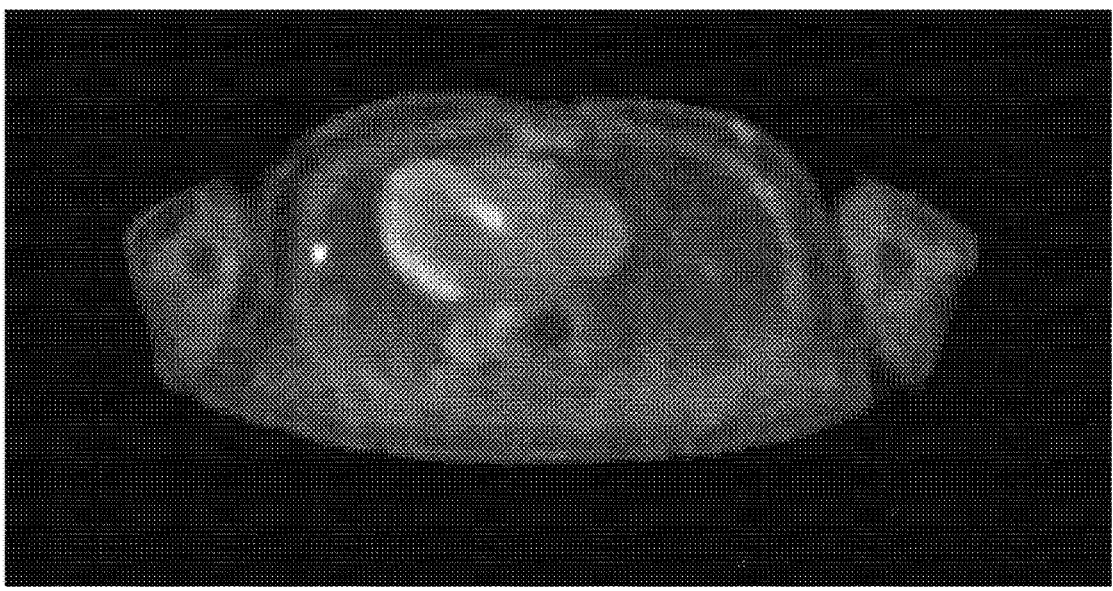
FIG. 1F shows a PET image using spatially-constant regularization with a large smoothing strength, according to one implementation.

FIGS. 1E and 1F show reconstructed PET images in which the regularization parameter β is spatially constant. In FIG. 1E, the regularization parameter β (i.e., smoothing strength) is small. In FIG. 1F the regularization parameter β (i.e., smoothing strength) is large. As shown by these figures, when reconstruction is performed using a spatially constant regularization parameter β, noise across different organs is not uniform. At the low levels of smoothing shown in FIG. 1E, the low activity regions such as lungs appear to be noisy, generating unphysical structure that might be confused for a lesion. As illustrated in FIG. 1F, when the smoothing level is increased to mitigate noise in the lung region, higher activity regions such as the heart become overly smooth and fine details are smeared out due to the poorer resolution. This tradeoff between resolution and noise is addressed through the use of a spatially varying map for the regularization parameter $\beta(\vec{r})$, thereby suppressing noise within low activity regions while preserving image features such as fine structures and sharp edges.

MRI reconstruction can also be performed by minimizing an objective function that includes a regularization term. For example, compressed sensing (CS) image reconstruction can be performed by solving the optimization problem $$\hat{u} = \underset{u}{\operatorname{argmin}} \|y_R - A_R E W'u\|_2^2 + \beta \|u\|_1,$$

wherein W is a wavelet transformation and W' is an inverse wavelet transformation, û and u are the wavelet transformations of the reconstructed image x (i.e., $\hat{u} = W\hat{x}$ and $\hat{x} = W'\hat{u}$), E is an ESPIRiT map (e.g., a map of the spatial distribution of the coil sensitivities), which is acquired from a central calibration region, $y_R$ is the MRI data for all channels with variable density random undersampling of phase encoding (PE) lines, and $A_R$ is a Fourier encoding matric for randomly undersampled acquisition, such that the hessian $A'_R A_R$ has not special structure. Here, the sparsity condition is found in the regularization term $\|u\|_1$, and the sparsity condition is expressed by applying the $\ell_1$ norm (i.e., $\|\cdot\|_1$) to the wavelet transformation u of the reconstructed image x. In the objective function, the expression $\|y_R - A_R E W'u\|_2^2$ is the data fidelity term, which is minimized in order to approximately solve the matrix equation $Ax = y_R$, wherein $A = A_R E$ and $x = W'u$. When the regularization parameter β is increased sparser solutions are favored at the expense of lower data fidelity, and, for a smaller regularization parameter β, improved data fidelity is encouraged at the expense of decreased sparsity. In this model, the regularization parameter β balances the relative contributions to the objective functions between data fidelity term and the regularization term.

Other examples of reconstruction processes used for MRI reconstruction include GRAPPA, SENSE, ARC, SPIRiT, LORAKS, ISTA, and FISTA. For compressed sensing (CS) data, the reconstruction process can be a non-linear process that enforces both the sparsity of the image representation within a given domain (e.g., spatial, time, wavelet) and the consistency of the reconstruction with the acquired scan data.

A person of ordinary skill in the art will understand that the above-discussed principles for X-ray CT imaging and PET imaging also apply to other medical imaging modalities (e.g., magnetic resonance imaging (MRI) and single-photon emission CT (SPECT)), in which an image is denoised and/or reconstructed by minimizing an objective that includes a regularization term together with a data fidelity term, such as magnetic resonance imaging (MRI). Accordingly, the methods described herein for training a neural network to perform feature-aware denoising apply generally to medical imaging modalities in which feature dependent levels of denoising/regularization can improve the resultant image quality. For clarity, the methods described herein are illustrated using the non-limiting example of X-ray CT as the medical imaging modality. However, the method is not limited to X-ray CT, as would be understood by a person of ordinary skill in the art.

Two different approaches can be used to denoise an image using a neural network. In on approach, the target data are denoised images and the input data is corresponding noisy images. Then the network is trained to directly predict the denoised image from the noisy image. That is, when a noisy image is applied to the neural network, the network outputs a corresponding denoised image. Alternatively, the method described herein can denoise an image by treating the noise as an additive residue that can be directly removed from the unaliased images using a Residual Network (ResNet). In this case, the input data is again a noisy image, but the target data is the noise by itself (e.g., the noisy image minus the denoised image). Thus, when a noisy image is applied to the neural network, the network outputs an image representing the noise itself. Then the denoised image can be generated by subtracting the network output from the input.

Figure 2A:
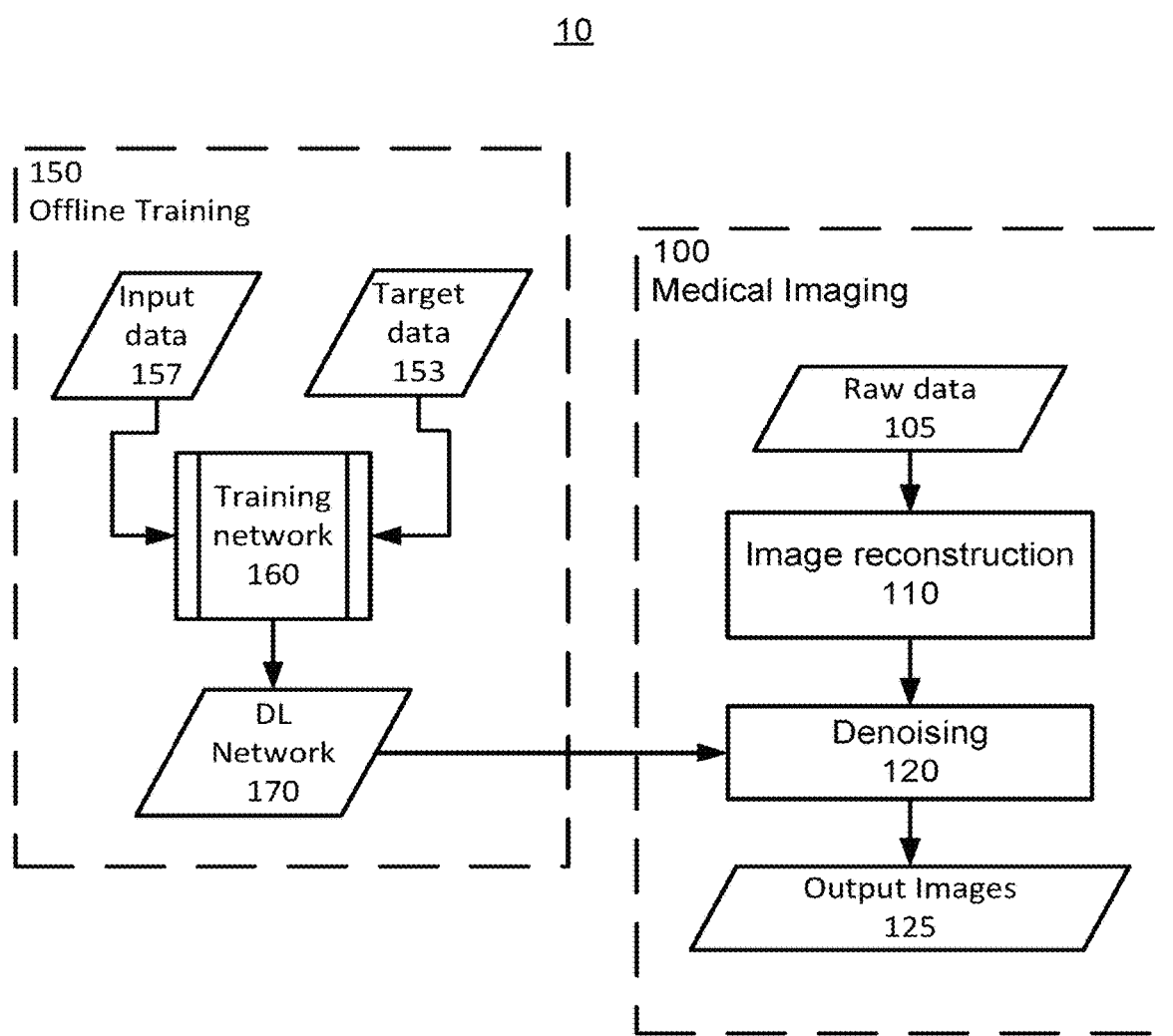
FIG. 2A shows a flow diagram of a method of training a neural network and then using the neural network to denoise a medical image that has been reconstructed from data of a medical imaging scan, according to one implementation.
Figure 2B:
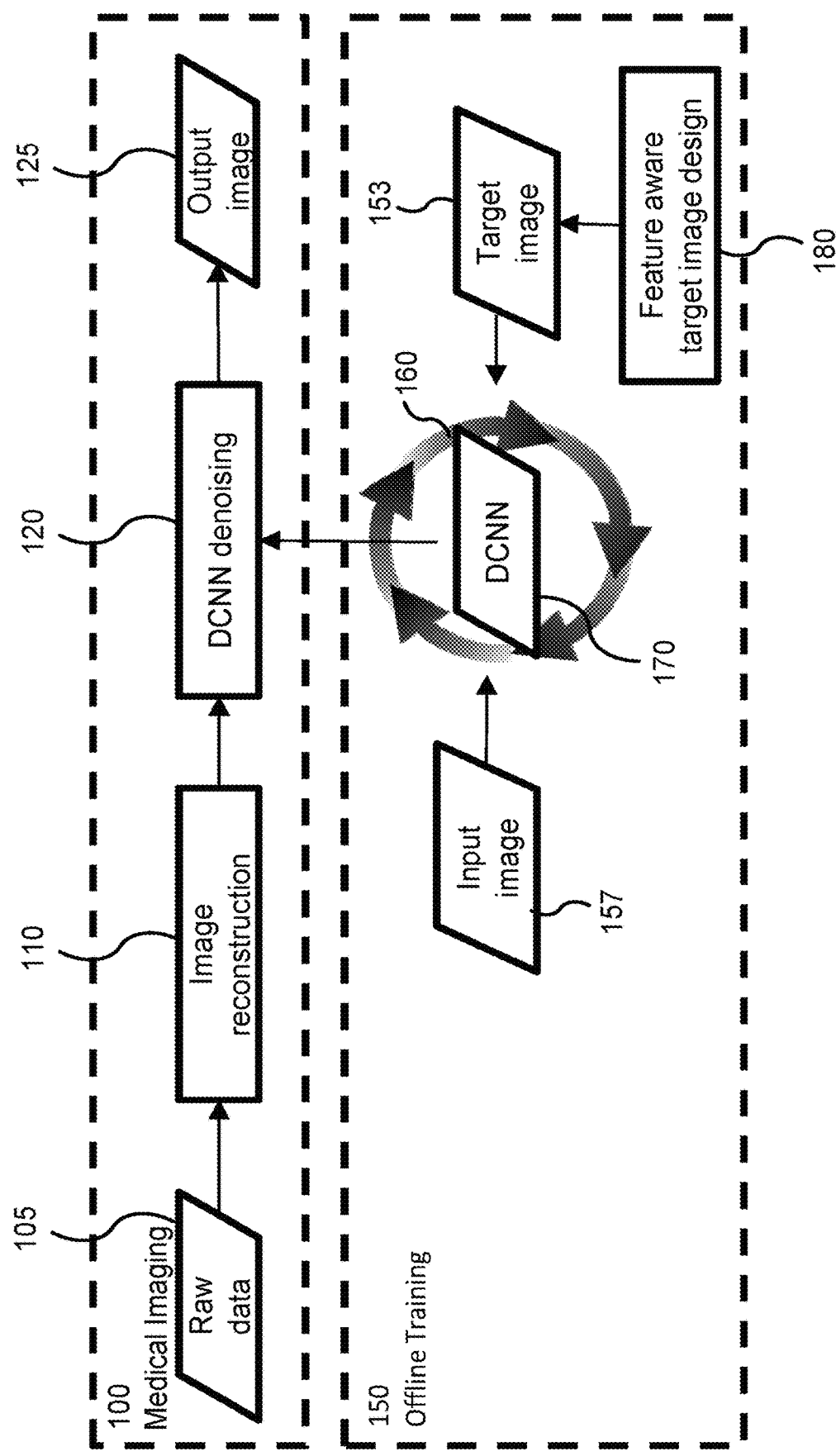
FIG. 2B shows a flow diagram of the neural-network training method in which the target data includes feature-aware denoising, according to one implementation.

FIGS. 2A and 2B show non-limiting examples of a method 10 that train and use a DL neural network 170 to aid in performing SMS medical image reconstruction. Method 10, as illustrated in FIG. 2A, uses a DL-ANN (DL network 170) to learn how to denoise a medical image reconstructed from raw data 105 acquired via a medical image scan/acquisition modality to generate a denoised image 125. Method 10 includes two parts: (i) an offline training process 150 and (ii) a medical imaging process 100. That is, process 150 trains the DL ANN 170, and process 100 uses the trained network 170 to denoise medical images, applying a spatially varying degree of denoising in accordance with features in to image to ultimately generate high-quality images 125 with less noise.

FIG. 2B shows a non-limiting example of processes 100 and 150. Similar steps are performed in process 160 to train the network 170. As discussed later, training the network 170 can be an iterative process in which input data from a training dataset is applied to the network 170 (similar to how the network 170 is to be used in step 120) and the result is compared to a desired output (i.e., target data from the training dataset) in an iterative process of adjusting the weighting coefficients of the network 170.

In certain implementations, the network 170 is a convolutional neural network (CNN) in which series of convolution (conv), batch normalization (BN), and rectified linear unit (ReLu) network layers are performed. In step 110, the medical image is reconstructed from the raw data 105. The reconstruction method in step 110 can be a same reconstruction method used to generate the input data 157 used in process 150 to train the network 170.

The network 170 is trained using process 160. In process 160, a loss function is used to iteratively adjust/optimize parameters of the DL-ANN network 170 (e.g., the parameters of the DL-ANN network 170 can include weighting coefficients connecting network layers, and activation functions/potentials of nodes within the layers). The optimization of the network parameters continues until stopping criteria are satisfied (e.g., a stopping criterion can be whether the value of the loss function has converged to a predefined threshold) to generate the trained network 170.

The loss function compares target data 153 to an output acquired using the input data 157 and a current version of the DL-ANN network 170. For example, by applying a noisy image from the input data to the current version of the DL-ANN network 170 to generate a network output that is compared to the corresponding low-noise image from the target data 153. The training of the network 170 is determined to be complete when the difference between output and the target data is minimized, sufficient to satisfy one or more predetermined stopping criteria of process 160. The trained network 170 can then be stored and used later in the medical imaging process 100.

For example, in the case that the medical imaging modality is PET imaging, the method 10 includes training a DL-CNN network 170 and applying a low-quality (e.g., noisy) PET image reconstructed from the raw data 105 to the trained network 170 to generate a high-quality (e.g., denoised) PET image 125.

In method 10, a loss function is used to iteratively adjust parameters (e.g., weights and biases of convolutional and pooling layers) of DL-CNN network until stopping criteria are satisfied (e.g., convergence of the parameters to a predefined threshold) to generate the trained network 170. The loss function compares high-quality data 153 to results of a current version of the DL-CNN network to which low-quality data 157 is applied. In the case of PET imaging, the high- and low-quality data are reconstructed PET images with high/good image quality and low/poor image quality, respectively. In general, the signal-to-noise ratio (SNR) is smaller when the image is reconstructed using a smaller dataset (e.g., due to a shorter scan time or other factors resulting in fewer coincidence counts). Accordingly, the high-quality image 153 can be generated using all of the coincidence counts from a PET scan of a patient to generate a PET image the highest possible image quality. On the other hand, the lower quality image 157 can be generated using a partial subset of coincidence counts selected from the full dataset, resulting in reconstructed image being a noisier image than the high-quality image 153. Further, the high-quality image 153 can be generated using a spatially varying regularization parameter in accordance with features represented in the reconstructed image. For example, less regularization can be used in regions with higher activity, in order to achieve finer resolution in the regions with higher activity.

After generating the trained network 170, process 100 is used to apply the trained network 170 to generate a high-quality PET image 125.

In certain implementations, the PET data 105 can be counts that are pre-processed (e.g., signal preconditioning, position corrections, energy corrections, etc.), and then, at step 110, the pre-processed count data is used to reconstruct an image of radioactivity level (e.g., tracer density) as a function of voxel position.

In step 110 of process 100, a PET image 255 is reconstructed from the PET emission data 105 using a PET image reconstruction process. The image reconstruction can be performed using a back-projection method, a filtered back-projection method, a Fourier-transform-based image reconstruction method, an iterative image reconstruction method, a matrix-inversion image reconstruction method, a statistical image reconstruction method, a list-mode method, or other reconstruction method as would be understood as a person of ordinary skill in the art.

In step 120, the reconstructed image is denoised using the DL-CNN network 170. The result of which is a high-quality image 125. Thus, noisy PET images resulting from the PET reconstruction in step 110 can be processed using a DL denoising algorithm applying the network generated by the offline DL training method 10.

In a non-limiting example of an implementation of methods 100 and 150, a deep residual learning framework is applied for image denoising. Let x be the clean image, and y be the noisy observation corrupted by additive noise n (i.e., y=x+n). The goals of the deep residual network is to estimate the noise n from the input noisy image y (i.e., $\mathcal{F}(y) \approx n$), wherein $\mathcal{F}$ is the residual mapping process. The denoised image $\hat{x}$ can then be obtained by subtracting the estimated noise $\mathcal{F}(y)$ from the reconstructed image y (i.e., $\hat{x} \approx y - \mathcal{F}(y)$). In certain implementations, the loss function can be formulated as $$L(\Theta) = \frac{1}{N} \sum_{i \in N} \psi(F(y_i; \Theta) - (y_i - x_i)),$$

wherein $\Theta$ denotes the trainable weights, $\psi$ is the error function (e.g., a mean square error (MSE) is used in the first example), N represents the number of training samples, y denotes the noisy images, and x denotes the target images. In the first example, stochastic gradient descent is used to minimize the loss function, and an eight layers network is used, providing a good balance between performance and training efficiency.

Figure 2C:
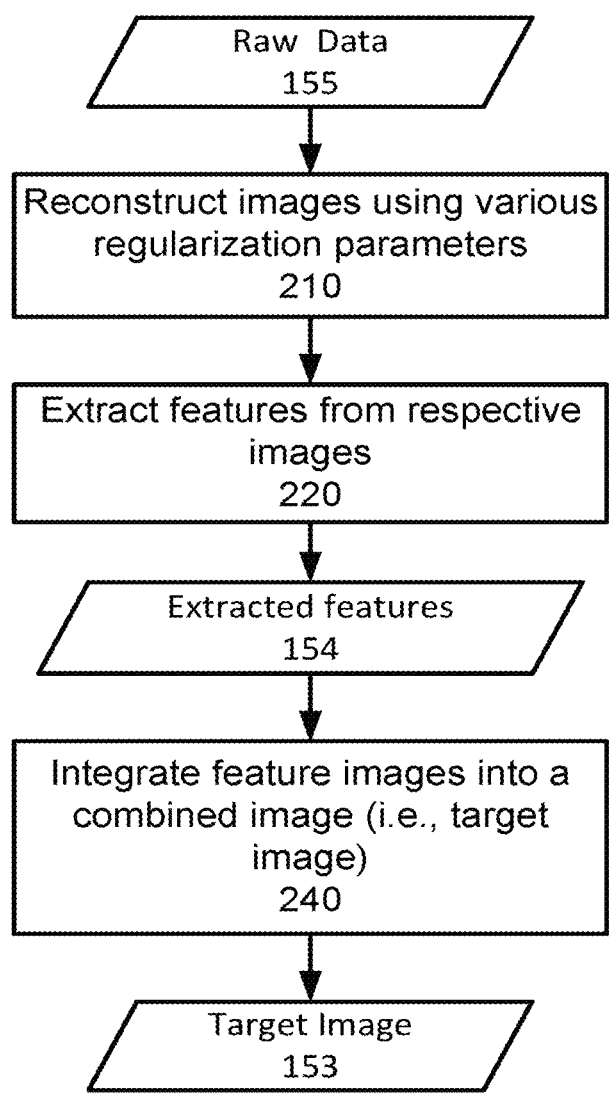
FIG. 2C shows a flow diagram of a method for generating the feature-aware target data, according to one implementation.
Figure 2D:
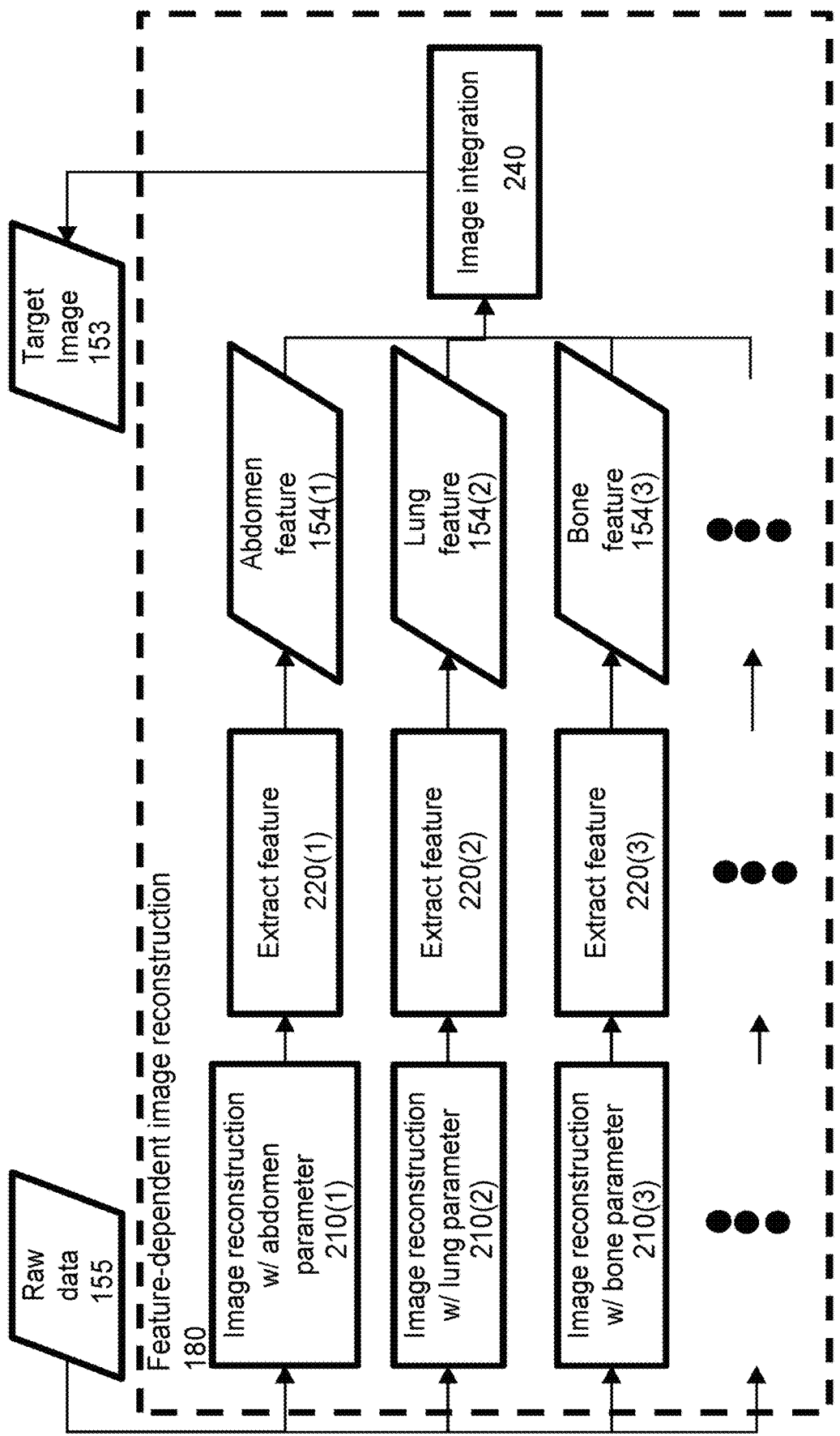
FIG. 2D shows a flow diagram of an implementation of the method for generating the feature-aware target data in which multiple reconstructions are performed with different reconstruction parameters, according to one implementation.

As discussed above, the target data has a spatially-varying, feature dependent degree of denoising/regularization. This variation in the degree of denoising can be generated at step 180 shown in FIG. 2B. Further, FIGS. 2C and 2D show respective flow diagrams for non-limiting examples of step 180. These flow diagrams are illustrated for the case that the medical imaging modality is X-ray CT, but other implementations are also within the spirit of this disclosure. For example, a spatial-varying regularization can be achieved for PET imaging using the method described in U.S. patent application Ser. No. 16/149,439, incorporated herein by reference in its entirety. For X-ray CT imaging, the spatial-varying degree of denoising can also be obtained using the methods described in U.S. patent applications Ser. Nos. 15/884,089 and 16/228,512, both of which are incorporated herein by reference in their entirety. These methods involve a spatial dependency for the regularization parameter. Additionally, spatially-varying denoising can be performed using a denoising process that is independent of or in addition to the image reconstruction process. For example, a reconstructed image can be smoothed using a Gaussian kernel with a spatially-dependent width (e.g., a smaller width for features with high contrast signal and a larger width for features with low contrast signal).

Exemplary denoising methods include linear smoothing filters, anisotropic diffusion, non-local means, or nonlinear filters. Linear smoothing filters remove noise by convolving the original image with a mask that represents a low-pass filter or smoothing operation. For example, the Gaussian mask comprises elements determined by a Gaussian function. This convolution brings the value of each pixel into closer agreement with the values of its neighbors. Anisotropic diffusion removes noise while preserving sharp edges by evolving an image under a smoothing partial differential equation similar to the heat equation. A median filter is an example of a nonlinear filter and, if properly designed, a nonlinear filter can also preserve edges and avoid blurring. The median filter is one example of a rank-conditioned rank-selection (RCRS) filter, which can be applied to remove salt and pepper noise from an image without introducing significant blurring artifacts. Additionally, a filter using a total-variation (TV) minimization regularization term can be applied if imaged region supports an assumption of uniformity over large areas that are demarked by sharp boundaries between the uniform areas. A TV filter is another example of a nonlinear filter. Moreover, non-local means filtering is an exemplary method of determining denoised pixels using a weighted average over similar patches within the images.

Returning to FIGS. 2C and 2D, the target data can be generated by reconstructing a series of different images using respective reconstruction processes 210(1), 210(2), 210(3), etc., each of which uses a reconstruction process/regularization parameter that is optimized for a respective type of features (e.g., abdomen features, lung features, bone features, etc.).

For example, different reconstruction parameters can be used to reconstruct images for different clinical purposes. The differences in the image reconstruction can extend beyond using different regularization parameter to include different reconstruction methods and other parameters and methods (e.g., edge enhancement methods).

In the example illustrated in FIG. 2D, the image reconstructed using the abdomen parameter can have greatly reduced noise at the expense of decreased resolution. Thus, the image is optimally reconstructed for diagnosis of the abdomen. Additionally, the image reconstructed using the bone parameter can have high resolution at the expense of increased noise.

A wide range of parameters can impact the image quality of a given reconstructed image. Any or all of these parameters can be included in the reconstruction parameters that are used to tune the reconstruction method to be optimal for a given clinical application and/or anatomical region. These various parameters that contribute to the image quality can include, e.g., parameters based on the clinical protocol, image processing parameters, reconstruction kernel, etc. Further, the reconstruction parameters that can be optimized can also include parameters for reconstruction artifact correction. Metal artifact, aliasing artifact, etc. correction depend on the reconstruction method, and these are related to the reconstruction parameters.

In steps 220(1), 220(2), 220(3), etc. the respective features (e.g., the abdomen feature 154(1), the lung feature 154(2), the bone feature 154(3), etc.) are extracted from the images generated in step 210. For example, the images can be segmented using a threshold and region growing method. Additionally, a Hounsfield map relating ranges of Hounsfield Units (HU) to particular features (e.g., abdomen, lung, bone, etc.) can be used. Additionally, image process for particular texture, structure, or a body atlas can be used to segment and determine regions and features within the generated images. In certain implementations, a user can provide input to segment the generated images into regions and tag the regions according to features represented therein.

For example, the features extracted from each of the generated images can be those features for which a given image was optimized. For example, for the image reconstructed to have optimal image quality in the abdomen, the features corresponding to the abdomen can be extracted. Likewise, for the image reconstructed to have optimal image quality for bones, the bone regions can be extracted, and so forth.

In step 240, a combined image is integrated from the respective features 154 to generate a target image 153. Accordingly, the target image 153 can have optimal image quality in each region and for each type of feature. In certain implementations, transitions between the segmented regions can be stitched together (e.g., a graded transition) to make the target image 153 appear uniform without abrupt boundaries between regions.

By training the network 170 using target data the has feature-dependent image quality and/or denoising, the network 170 learns to recognizes those features and to output images having similar image quality and/or denoising when corresponding features are in the input images applied to the network 170.

Figure 3A:
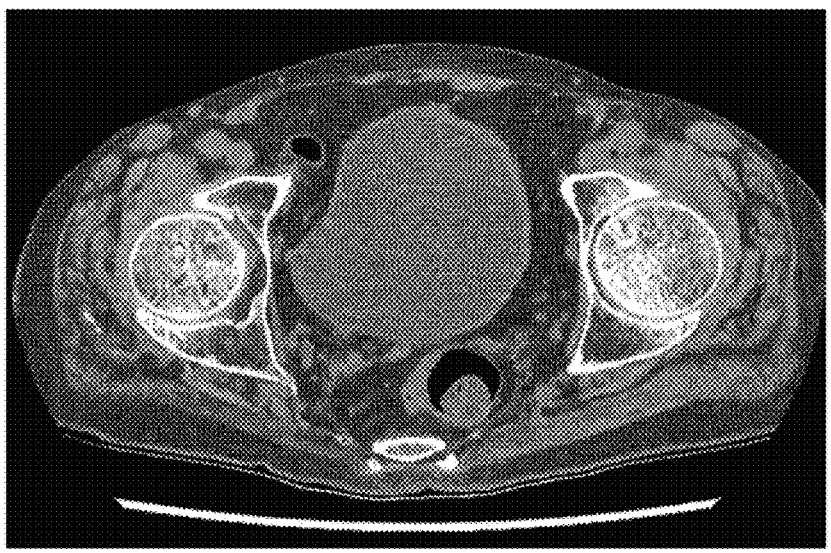
FIG. 3A shows a CT image generated using a regularization parameter optimized for an abdomen region, according to one implementation.
Figure 3B:
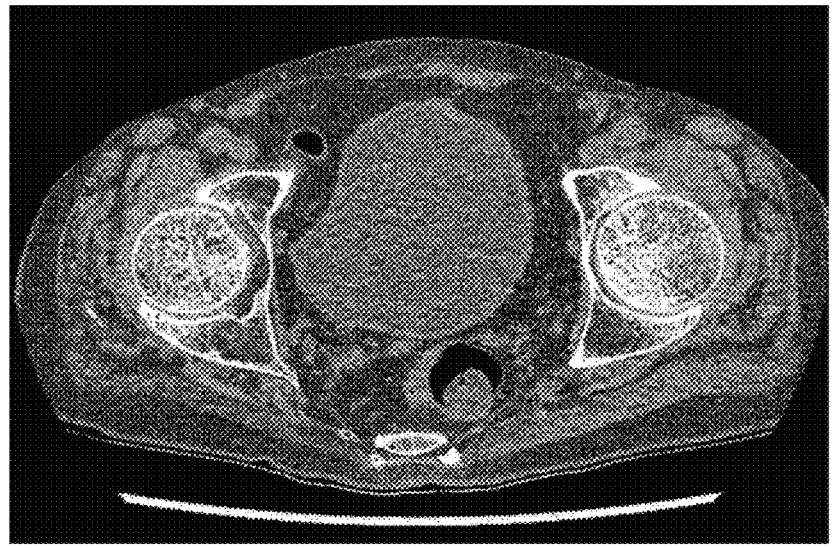
FIG. 3B shows a CT image generated using a regularization parameter optimized for a lung region, according to one implementation.
Figure 3C:
FIG. 3C shows a CT image generated using a regularization parameter optimized for a bone region, according to one implementation.

FIGS. 3A, 3B, and 3C show examples of reconstructed images generated using reconstructions optimized for abdomen, lung, and bone regions, respectively. As shown by FIGS. 3A, 3B, and 3C, MBIR can improve the tradeoffs between noise texture and spatial resolution. This is often done thru the regularization parameter tuning. However, in many clinical applications, simply adjusting the global parameters can be insufficient to create the desired/optimal organ-dependent noise texture and spatial resolution for all organs and features represented in the reconstructed image.

FIGS. 3A, 3B, and 3C show examples in which the same set of raw data 105 is used to reconstruct three different images each using a different regularization parameter. In FIG. 3A, when the abdomen-optimized parameter is used for the regularization parameter, the image shows good noise texture in soft tissue at the expense of compromised spatial resolution in the bone structure. In FIG. 3C, when the bone-optimized parameter is used for the regularization parameter, the image shows good spatial resolution in bone structure at the expense of compromised noise texture in the soft tissue. In FIG. 3B, when the lung-optimized parameter is used for the regularization parameter, the image shows a combination of intermediate spatial resolution with intermediate noise texture, which is a compromise that is optimal for lung regions.

The above can be better understood by considering that in many clinical cases, diagnosis is performed for different anatomies/organs within a single image. Thus, it is undesirable and inefficient to have three separate images, each optimized for different anatomies/organs. It is better to integrate good features reconstructed with different parameters into one image. Although this might be achieved by reconstructing the image multiple times using different parameters for each of the images, as shown in FIGS. 3A, 3B, and 3C and then merging these features/regions together to form a single feature-aware reconstruction, reconstructing multiple images is inefficient. Accordingly, the methods described herein reconstruct a single image, and then apply the reconstructed image to the network 170, which has been trained to perform feature-aware denoising in order to achieve the desired tradeoff between resolution and noise texture for each of the anatomies/organs within the reconstructed image.

Now a more detailed description of training a DL-ANN network is provided (e.g., process 160). This description is illustrated using the target data 153 being feature-aware denoised images and the input data 157 being noisy images.

Figure 4:
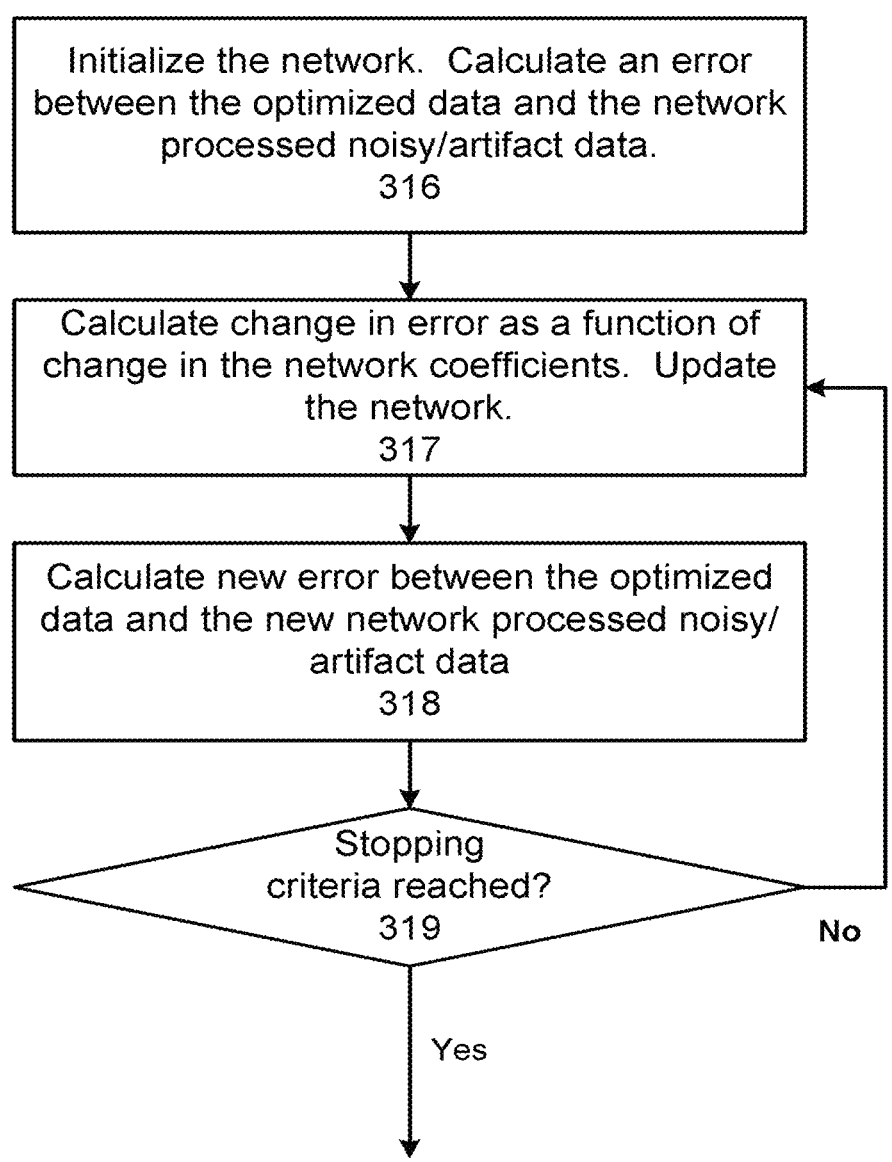
FIG. 4 shows a flow diagram of training a DL-ANN network by iteratively adjusting coefficients of the DL-ANN network to optimize a loss-error function, according to one implementation.

FIG. 4 shows a flow diagram of one implementation of the training process 160. In process 160, low-quality data 157 and high-quality data 153 are used as training data to train a DL-ANN network, resulting in the DL-ANN network being output from step 319 of process 160. The offline DL training process 160 trains the DL-ANN network 170 using a large number of input images 157 that are paired with corresponding target images 153 to train the DL-ANN network 170 to produce images resembling the target images 153 from the input images 157.

In process 160, a set of training data is obtained, and the network 170 is iteratively updated to reduce the error (e.g., the value produced by a loss function). The DL-ANN network infers the mapping implied by the training data, and the cost function produces an error value related to the mismatch between the target images 153 and the result produced by applying a current incarnation of the DL-ANN network 170 to the input images 157. For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a (stochastic) gradient descent method.

In step 316 of process 160, an initial guess is generated for the coefficients of the DL-ANN network 170. For example, the initial guess can be based on a priori knowledge of the region being imaged or one or more exemplary denoising methods, edge-detection methods, and/or blob detection methods. Additionally, the initial guess can be based on one of a LeCun initialization, an Xavier initialization, and a Kaiming initialization.

Steps 316 through 319 of process 160 provide a non-limiting example of an optimization method for training the DL-ANN network 170.

An error is calculated (e.g., using a loss function or a cost function) to represent a measure of the difference (e.g., a distance measure) between the target images 153 (i.e., ground truth) and input images 157 after applying a current version of the network 170. The error can be calculated using any known cost function or distance measure between the image data, including those cost functions described above. Further, in certain implementations the error/loss function can be calculated using one or more of a hinge loss and a cross-entropy loss.

In certain implementations, the network 170 is trained using backpropagation. Backpropagation can be used for training neural networks and is used in conjunction with gradient descent optimization methods. During a forward pass, the algorithm computes the network's predictions based on the current parameters $\Theta$. These predictions are then input into the loss function, by which they are compared to the corresponding ground truth labels (i.e., the high-quality image 153). During the backward pass, the model computes the gradient of the loss function with respect to the current parameters, after which the parameters are updated by taking a step of size of a predefined size in the direction of minimized loss (e.g., in accelerated methods, such that the Nesterov momentum method and various adaptive methods, the step size can be selected to more quickly converge to optimize the loss function).

The optimization method by which the backprojection is performed can use one or more of gradient descent, batch gradient descent, stochastic gradient descent, and mini-batch stochastic gradient descent. The forward and backwards passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to FIG. 4, step 317 of process 160 determines a change in the error as a function of the change in the network can be calculated (e.g., an error gradient), and this change in the error can be used to select a direction and step size for a subsequent change to the weights/coefficients of the DL-ANN network 170. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 317 of process 160, a new set of coefficients are determined for the DL-ANN network 170. For example, the weights/coefficients can be updated using the changed calculated in step 317, as in a gradient descent optimization method or an over-relaxation acceleration method.

In step 318 of process 160, a new error value is calculated using the updated weights/coefficients of the DL-ANN network 170.

In step 319, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations is reached. When the stopping criteria is not satisfied the training process performed in process 160 will continue back to the start of the iterative loop by returning and repeating step 317 using the new weights and coefficients (the iterative loop includes steps 317, 318, and 319). When the stopping criteria are satisfied the training process performed in process 160 is completed.

Figure 5A:
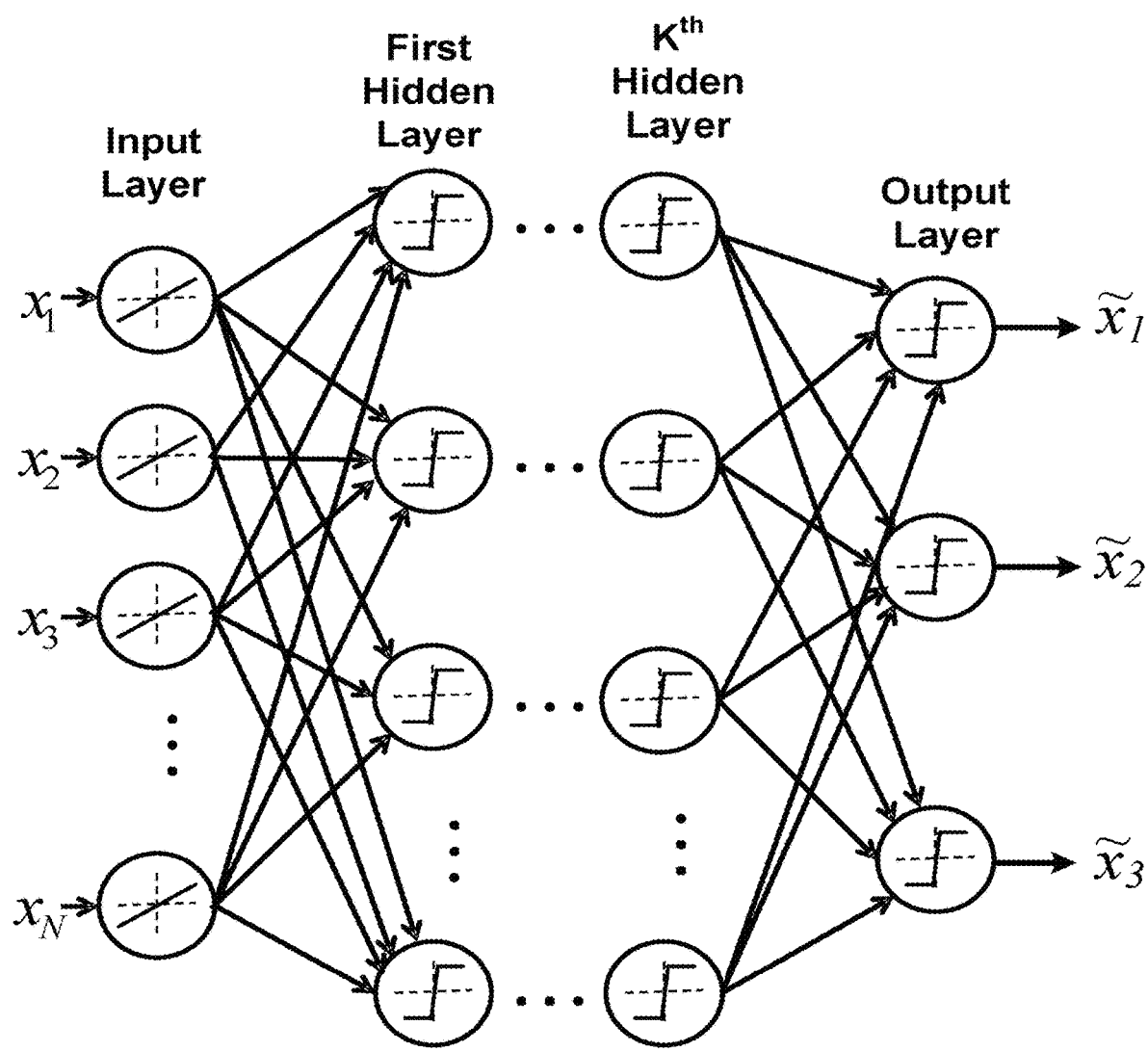
FIG. 5A shows an example of a feedforward ANN, according to one implementation.
Figure 5B:
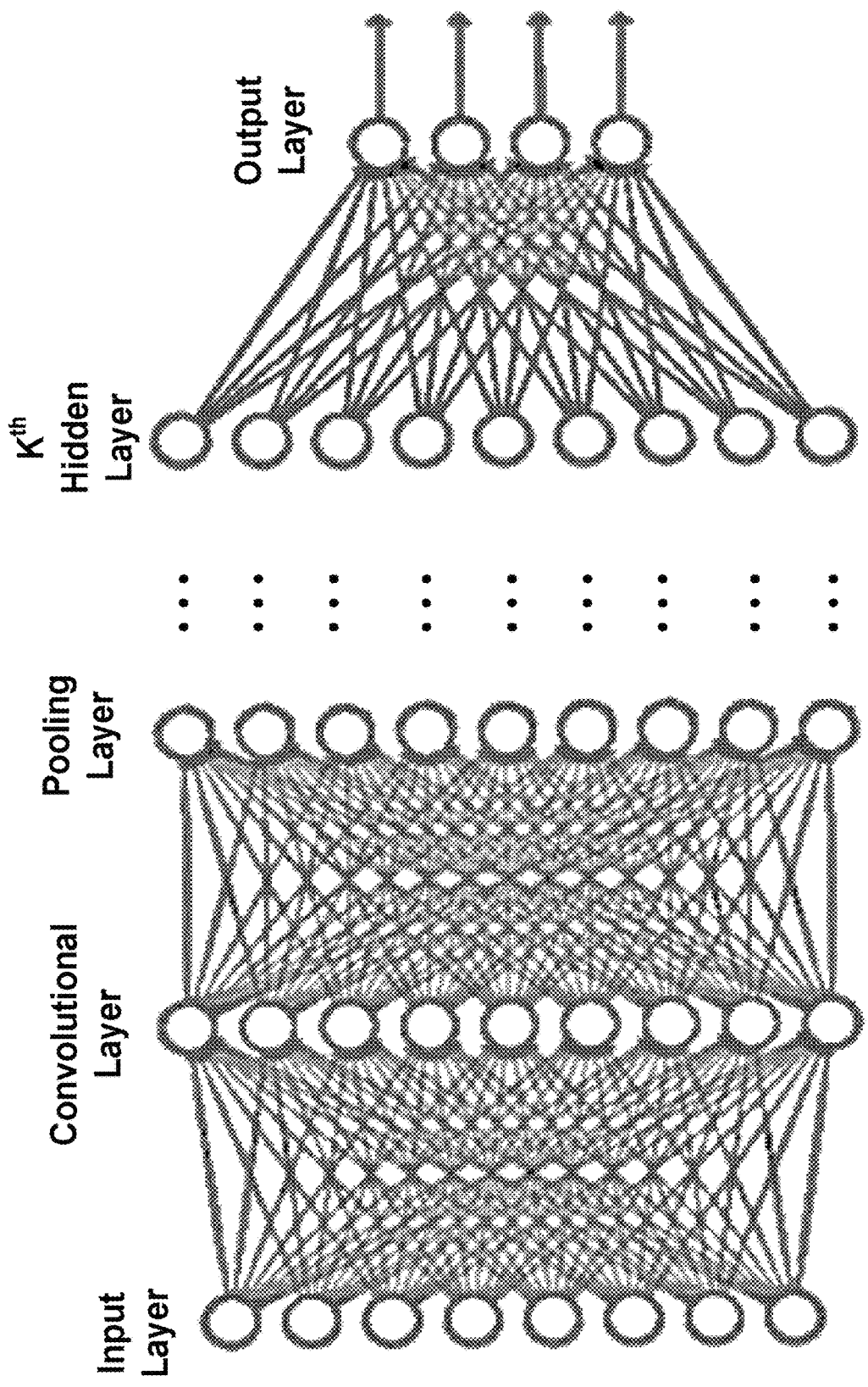
FIG. 5B shows an example of a type of ANN referred to as a convolutional neural network (CNN), according to one implementation.

FIGS. 5A and 5B show various examples of the interconnections between layers in the DL-ANN network 170. The DL-ANN network 170 can include fully connected, convolutional, and the pooling layer, all of which are explained below. In certain preferred implementations of the DL-ANN network 170, convolutional layers are placed close to the input layer, whereas fully connected layers, which perform the high-level reasoning, are place further down the architecture towards the loss function. Pooling layers can be inserted after convolutions and proved a reduction lowering the spatial extent of the filters, and thus the amount of learnable parameters. Activation functions are also incorporated into various layers to introduce nonlinearity and enable the network to learn complex predictive relationships. The activation function can be a saturating activation functions (e.g., a sigmoid or hyperbolic tangent activation function) or rectified activation function (e.g., the Rectified Linear Unit (ReLU) applied in the first and second examples discussed above). The layers of the DL-ANN network 170 can also incorporate batch normalization, as also exemplified in the first and second examples discussed above.

FIG. 5A shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can further be defined as a composition of other functions. This can be conveniently represented as a network structure, with arrows depicting the dependencies between variables, as shown in FIG. 5A. For example, the ANN can use a nonlinear weighted sum, wherein $m(x)=K(\Sigma_i w_i n_i(x))$, where K (commonly referred to as the activation function) is some predefined function, such as the hyperbolic tangent.

In FIG. 5A (and similarly in FIG. 5B), the neurons (i.e., nodes) are depicted by circles around a threshold function. For the non-limiting example shown in FIG. 5A, the inputs are depicted as circles around a linear function, and the arrows indicate directed connections between neurons. In certain implementations, the DL-ANN network 170 is a feedforward network.

FIG. 5B shows a non-limiting example in which the DL-ANN network 170 is a convolutional neural network (CNN). CNNs are type of ANN that has beneficial properties for image processing, and, therefore, have specially relevancy for the applications of image denoising. CNNs use feed-forward ANNs in which the connectivity pattern between neurons can represent convolutions in image processing. For example, CNNs can be used for image-processing optimization by using multiple layers of small neuron collections which process portions of the input image, called receptive fields. The outputs of these collections can then tiled so that they overlap, to obtain a better representation of the original image. This processing pattern can be repeated over multiple layers having alternating convolution and pooling layers.

Following after a convolutional layer, a CNN can include local and/or global pooling layers, which combine the outputs of neuron clusters in the convolution layers. Additionally, in certain implementations, the CNN can also include various combinations of convolutional and fully connected layers, with pointwise nonlinearity applied at the end of or after each layer.

Figure 6:
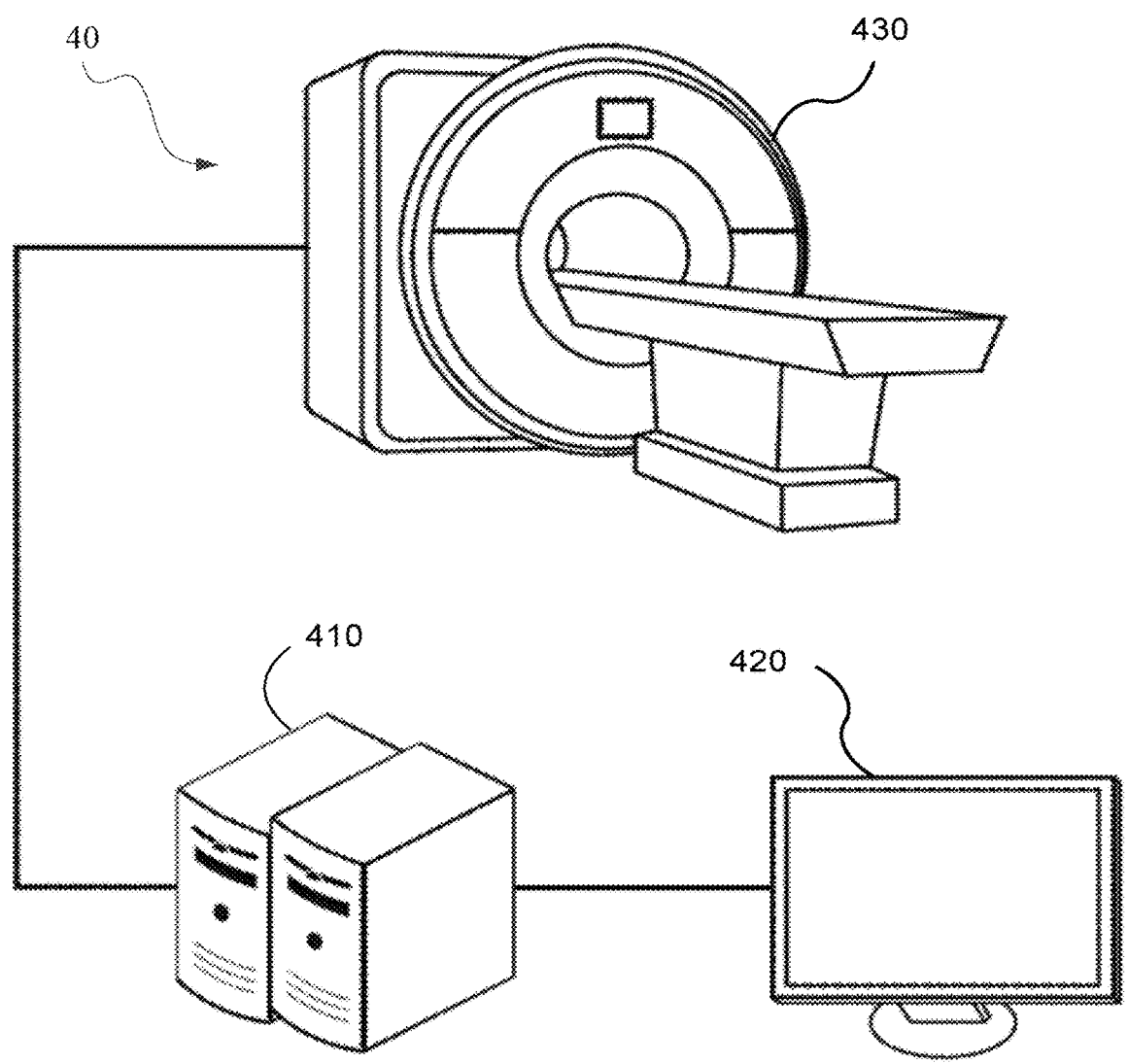
FIG. 6 shows an example of a medical imaging scanner (e.g., the scanner can be a magnetic resonance imaging (MRI) scanner, a positron emission tomography (PET) scanner, an X-ray computed tomography (CT) scanner, or a combination thereof), according to one implementation.

FIG. 6 illustrates an example embodiment of a medical-imaging system 40. The medical-imaging system 40 includes at least one scanning device 430; one or more image-generation devices 410, each of which is a specially-configured computing device (e.g., a specially-configured desktop computer, a specially-configured laptop computer, a specially-configured server); and a display device 420.

The scanning device 430 is configured to acquire scan data by scanning a region (e.g., area, volume, slice) of an object (e.g., a patient). The scanning modality may be, for example, magnetic resonance imaging (MRI), computed tomography (CT), positron emission tomography (PET), X-ray radiography, and ultrasonography. The scanning device 430 may acquire a randomly undersampled set of scan data that is appropriate for compressed-sensing reconstruction or acquire scan data that may be used by a compressed-sensing process. Accordingly, compressed-sensing data includes scan data that may be used by a compressed-sensing process or that is appropriate for compressed-sensing reconstruction.

The one or more image-generation devices 410 obtain scan data from the scanning device 430 and generate an image of the region of the object based on the scan data. To generate the image, for example when the scan data is compressed-sensing data, the one or more image-generation devices 430 may perform the steps of method 100.

After the one or more image-generation devices 410 generate the image, the one or more image-generation devices 410 send the image to the display device 420, which displays the image.

Figure 7:
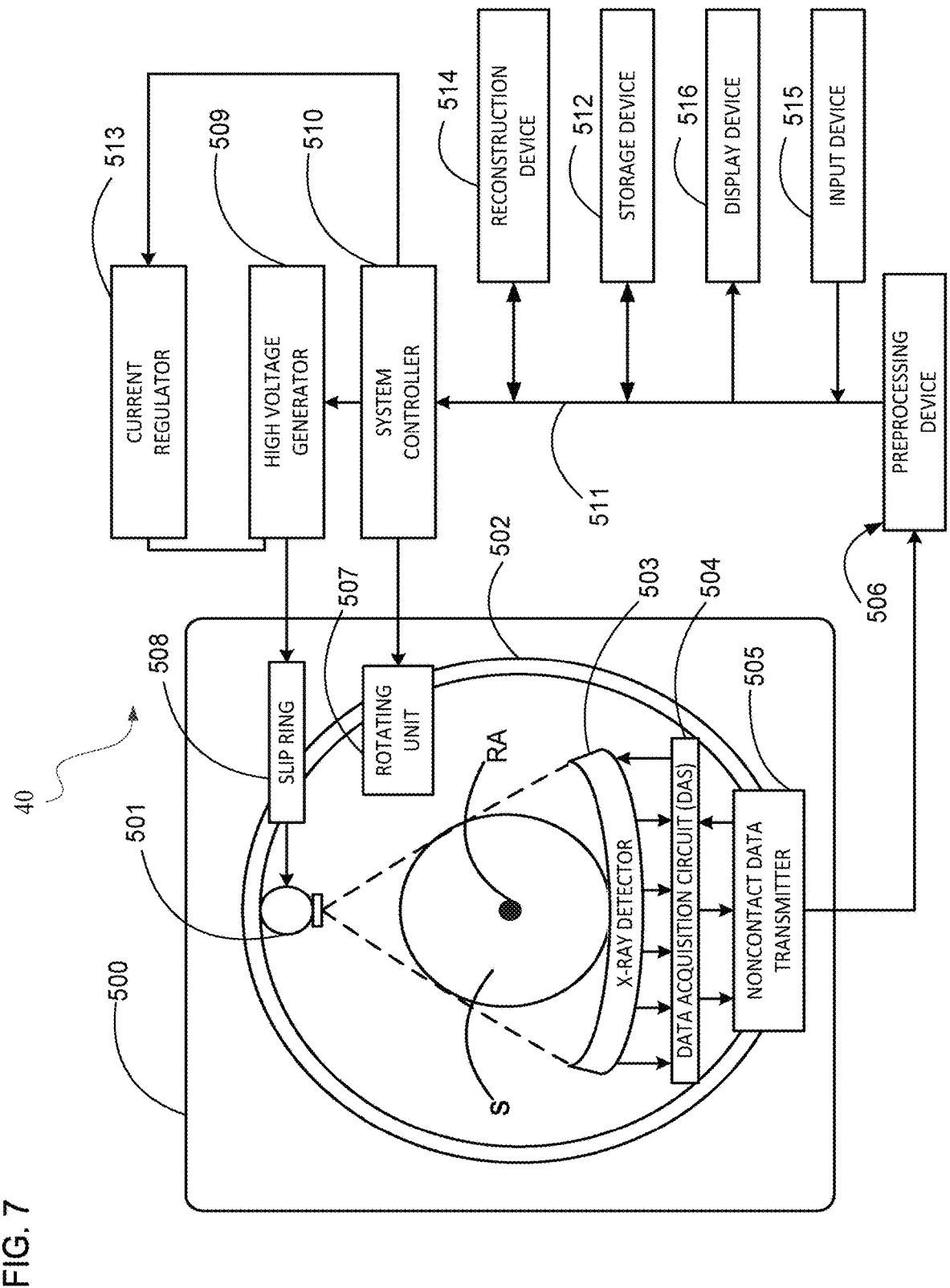
FIG. 7 shows an example of an X-ray CT scanner, according to one implementation.

FIG. 7 illustrates an implementation in which the medical-imaging system 40 includes a CT scanner system 10. As shown in FIG. 7, a radiography gantry 500 is illustrated from a side view and further includes an X-ray tube 501, an annular frame 502, and a multi-row or two-dimensional-array-type X-ray detector 503. The X-ray tube 501 and X-ray detector 503 are diametrically mounted across an object OBJ on the annular frame 502, which is rotatably supported around a rotation axis RA.

The multi-slice X-ray CT apparatus further includes a high voltage generator 509 that generates a tube voltage applied to the X-ray tube 501 through a slip ring 508 so that the X-ray tube 501 generates X-rays. The X-rays are emitted towards the object OBJ, whose cross sectional area is represented by a circle. For example, the X-ray tube 501 having an average X-ray energy during a first scan that is less than an average X-ray energy during a second scan. Thus, two or more scans can be obtained corresponding to different X-ray energies. The X-ray detector 503 is located at an opposite side from the X-ray tube 501 across the object OBJ for detecting the emitted X-rays that have transmitted through the object OBJ. The X-ray detector 503 further includes individual detector elements or units.

The CT apparatus further includes other devices for processing the detected signals from X-ray detector 503. A data acquisition circuit or a Data Acquisition System (DAS) 504 converts a signal output from the X-ray detector 503 for each channel into a voltage signal, amplifies the signal, and further converts the signal into a digital signal.

The above-described data is sent to a preprocessing circuitry 506, which is housed in a console outside the radiography gantry 500 through a non-contact data transmitter 505. The preprocessing circuitry 506 performs certain corrections, such as sensitivity correction on the raw data. A storage 512 stores the resultant data, which is also called projection data at a stage immediately before reconstruction processing. The storage 512 is connected to a processing circuitry 510 through a data/control bus 511, together with a reconstruction device 514, input interface 515, and display 516. The processing circuitry 510 controls a current regulator 513 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 501 and the X-ray detector 503 are diametrically mounted on the annular frame 502 and are rotated around the object OBJ as the annular frame 502 is rotated about the rotation axis RA. In the fourth-generation geometry system, the detectors are fixedly placed around the patient and an X-ray tube rotates around the patient. In an alternative embodiment, the radiography gantry 500 has multiple detectors arranged on the annular frame 502, which is supported by a C-arm and a stand.

The storage 512 can store the measurement value representative of the irradiance of the X-rays at the X-ray detector unit 503. Further, the storage 512 can store a dedicated program for executing method 100.

The reconstruction circuitry 514 can execute various steps of method 100. Further, reconstruction circuitry 514 can execute pre-reconstruction processing image processing such as volume rendering processing and image difference processing as needed.

The pre-reconstruction processing of the projection data performed by the preprocessing circuitry 506 can include correcting for detector calibrations, detector nonlinearities, and polar effects, for example.

Post-reconstruction processing performed by the reconstruction circuitry 514 can include filtering and smoothing the image, volume rendering processing, and image difference processing as needed. The image reconstruction process can implement various steps of method 100. The reconstruction circuitry 514 can use the memory to store, e.g., projection data, reconstructed images, calibration data and parameters, and computer programs.

The reconstruction circuitry 514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the storage 512 can be non-volatile, such as ROM, EPROM, EEPROM or FLASH memory. The storage 512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction circuitry 514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 516. The display 516 can be an LCD display, CRT display, plasma display, OLED, LED or any other display known in the art.

The storage 512 can be a hard disk drive, CD-ROM drive, DVD drive, FLASH drive, RAM, ROM or any other electronic storage known in the art.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
circuitry configured to
obtain radiation data representing radiation detected at a plurality of detectors,
reconstruct, using the radiation data, a first image,
acquire a neural network including weighting coefficients of connections between neuronal nodes of respective layers of a plurality of layers between an input layer and an output layer of the neural network, the neural network having been trained using a training dataset that includes pairs of input images and target images, the target images exhibiting a spatially varying degree of denoising relative to the corresponding input images, the spatially varying degree of denoising corresponding to locations of features represented in the target images, and
apply the neural network to the first image to generate a second image, the second image having reduced noise relative the first image, and an amount that the noise is reduced varying in accordance with positions of features represented in the first image, thereby providing feature-aware denoising of the first image.

2. The apparatus according to claim 1, wherein the circuitry is further configured to obtain the radiation data, and the radiation data is one of X-ray computed tomography (CT) data, gamma-ray positron emission tomography (PET), single-photon emission CT data (SPECT), and magnetic resonance imaging (MRI) data.

3. The apparatus according to claim 1, wherein the circuitry is further configured to acquire the neural network, wherein the neural network has been trained by iteratively adjusting the weighting coefficients to minimize a loss function representing respective differences between the respective target images and corresponding output images generated by applying the neural network to the input images.

4. The apparatus according to claim 1, wherein the circuitry is further configured to
reconstruct the first image using an analytical computed tomography (CT) technique, wherein the input images of the training dataset are also reconstructed using the analytical CT technique, and
the acquired neural network is trained using one or more iterative reconstruction methods in which different degrees of regularization and/or denoising are applied in accordance with respective features within regions of the target images.

5. The apparatus according to claim 4, wherein
the circuitry is further configured to reconstruct the first image using the analytical CT technique, wherein the analytical CT technique is a filter back-projection method, and
the one or more iterative reconstruction methods, which generates target data used to train the network, iteratively minimizes an objective function having both a data-fidelity term and a regularization term, and the degree of regularization, which varies spatially depending on features within a given region, depends on a relative magnitude between the data-fidelity term and the regularization term in the objective function.

6. The apparatus according to claim 4, wherein the analytical CT technique used by the circuitry requires less computation to generate a reconstructed image than do the respective one or more iterative reconstruction methods.

7. An apparatus, comprising:
circuitry configured to
obtain a training dataset that includes pairs of input images and target images, the input images and the target images being reconstructed medical images from radiation data of a predefined anatomical region, the input images exhibiting greater noise than the target images, and the target images having spatially varying regularization based on features represented in the respective target images,
initialize a neural network to denoise an output from the neural network relative to an input applied to the neural network, and
train the neural network to apply greater denoising to regions in the input image corresponding to the features in the target images having greater regularization, wherein
the neural network includes weighting coefficients of connections between neuronal nodes of respective layers of a plurality of layers between an input layer and an output layer of the neural network, and
the training the neural network includes iteratively adjusting the weighting coefficients to minimize a loss function representing respective differences between the respective target images and output images from applying the neural network to the input images.

8. The apparatus according to claim 7, wherein the circuitry is further configured to obtain the training dataset by
obtaining the radiation data representing the radiation detected at a plurality of detectors,
reconstructing one of the inputs images from the radiation data using a first image reconstruction method,
reconstructing a plurality of images corresponding to various degrees of regularization, the plurality of images being respectively reconstructed from the radiation data using a second reconstruction method, and
combining respective regions within the plurality of images based on features represented in the respective regions to generate a combined image having a feature-dependent spatial variation in a degree of regularization.

9. The apparatus according to claim 7, wherein the circuitry is further configured to obtain the training dataset by
obtaining the radiation data representing the radiation detected at a plurality of detectors,
reconstructing one of the inputs images from the radiation data using a first image reconstruction method, and
reconstructing one of the target images from the radiation data using a second reconstruction method, the second reconstruction method applying a spatially varying degree of regularization based on features represented in the one of the target images.

10. The apparatus according to claim 9, wherein the first image reconstruction method used by the circuitry requires less computation than the second reconstruction method.

11. The apparatus according to claim 9, wherein the first image reconstruction method includes filtered back-projections and the second reconstruction method is an iterative reconstruction method to minimize an objective function having both a data-fidelity term and a regularization term, and the degree of regularization depends on a relative magnitude between the data-fidelity term and the regularization term in the objective function.

12. The apparatus according to claim 9, wherein the circuitry is further configured to obtain a training dataset such that the radiation data used to reconstruct the input images and target images is one of X-ray computed tomography (CT) data, gamma-ray positron emission tomography (PET) data, single-photon emission CT data (SPECT) data, and magnetic resonance imaging (MRI) data.

13. The apparatus according to claim 1, wherein
the circuitry is further configured to obtain X-ray computed tomography (CT) data as the radiation data, and
the apparatus further comprises a gantry including
an X-ray source configured to transmit radiation into an opening in the gantry, and
the plurality of detectors arranged across the opening from the X-ray source, the plurality of detectors being configured to detect an intensity of X-ray radiation from the X-ray source and generate the radiation data.

14. A method, comprising:
obtaining radiation data representing radiation detected at a plurality of detectors;
reconstructing, using the radiation data, a first image;
acquiring a neural network including weighting coefficients of connections between neuronal nodes of respective layers of a plurality of layers between an input layer and an output layer of the neural network, the neural network having been trained using a training dataset that includes pairs of input images and target images, the target images exhibiting a spatially varying degree of denoising relative to corresponding input images, the spatially varying degree of denoising corresponding to locations of features represented in the target images; and
applying the neural network to the first image to generate a second image, the second image having reduced noise relative the first image, and an amount that the noise is reduced varying in accordance with positions of features represented in the first image, thereby providing feature-aware denoising of the first image.

15. The method according to claim 14, wherein obtaining the radiation data includes that the radiation data is one of X-ray computed tomography (CT) data, gamma-ray positron emission tomography (PET), single-photon emission CT data (SPECT), and magnetic resonance imaging (MRI) data.

16. The method according to claim 14, wherein acquiring the neural network includes that the neural network has been trained by iteratively adjusting the weighting coefficients to minimize a loss function representing respective differences between the respective target images and output images from applying the neural network to the input images.

17. The method according to claim 14, wherein
reconstructing the first image is performed using a filter back-projection method, and the input images of the training dataset are also reconstructed using the filter back-projection method,
the acquired neural network is trained using one or more iterative reconstruction methods in which different degrees of regularization and/or denoising are applied in accordance with respective features within regions of the target images, and
the one or more iterative reconstruction methods, which generates target data used to train the network, iteratively minimizes an objective function having both a data-fidelity term and a regularization term, and the degree of regularization, which varies spatially in accordance with locations of features represented in respective regions of the target images.

18. The method according to claim 14, further comprising the steps of training the neural network by
obtaining a training dataset that includes pairs of input images and target images, the input images and the target images being reconstructed medical images from radiation data of a predefined anatomical region of respective patients, the input images exhibiting greater noise than the target images, and the target images having spatially varying regularization based on features represented in the respective target images,
initializing a neural network to denoise an output from the neural network relative to an input applied to the neural network, and
training the neural network to apply greater denoising to regions in the input image corresponding to the features in the target images having greater regularization, wherein
the neural network includes weighting coefficients of connections between neuronal nodes of respective layers of a plurality of layers between an input layer and an output layer of the neural network, and
the training the neural network includes iteratively adjusting the weighting coefficients to minimize a loss function representing respective differences between the respective target images and output images from applying the neural network to the input images.

19. The method according to claim 18, wherein the step of obtaining the training dataset further comprises
obtaining the radiation data representing the radiation detected at a plurality of detectors,
reconstructing one of the inputs images from the radiation data using a first image reconstruction method,
reconstructing a plurality of images corresponding to various degrees of regularization, the plurality of images being respectively reconstructed from the radiation data using a second reconstruction method, and
combining respective regions within the plurality of images based on features represented in the respective regions to generate a combined image having a feature-dependent spatial variation in a degree of regularization.

20. A non-transitory computer-readable storage medium including executable instructions, which when executed by circuitry, cause the circuitry to perform the method according to claim 14.

21. An apparatus for medical image processing, comprising:
circuitry configured to
obtain a medical image,
apply a trained neural network to the obtained medical image to generate an output image wherein quality of the output image is improved by the trained neural network, wherein the trained neural network is trained based on a plurality of pairs of a low-quality image and a high-quality image, and the high-quality image is generated by a process including:
obtaining scan data acquired by scanning a region of an object,
reconstructing, using the scan data, a plurality of medical images under a plurality of different parameters,
extracting features, each of the features being extracted from a different one of the plurality of reconstructed medical images and corresponding to one of the plurality of different parameters, and
integrating the extracted features to acquire an integrated medical image, wherein the integrated medical image is used as the high-quality image, and each of the parameters is a parameter for optimizing an image quality of a corresponding feature.

22. The apparatus according to claim 21, wherein
the reconstructing comprises using the scan data to obtain a first image and a second image as the plurality of medical images, and the first image is reconstructed under a first parameter corresponding to a first region of the object and the second image is reconstructed under a second parameter corresponding to a second region of the object.

23. The apparatus according to claim 22, wherein the extracting comprises extracting a first feature corresponding to the first region from the first image and extracting a second feature corresponding to the second region from the second image.

24. The apparatus according to claim 22, wherein
the first parameter is a parameter for optimizing an image quality of the first region, and the second parameter is a parameter for optimizing an image quality of the second region.

25. The apparatus according to claim 21, wherein
the circuitry is configured to obtain the medical image using an analytical reconstruction technique, the low-quality image is reconstructed using an analytical reconstruction technique, and the reconstructing comprises reconstructing the plurality of medical images using an iterative reconstruction method.

26. The apparatus according to claim 21, wherein the process of generating the high-quality image is included in an offline process.

27. A method of medical image processing, comprising:
obtaining a medical image, applying a trained neural network to the obtained medical image to generate an output image wherein quality of the output image is improved by the trained neural network, wherein the trained neural network is trained based on a plurality of pairs of a low-quality image and a high-quality image, and the high-quality image is generated by a process including:

obtaining scan data acquired by scanning a region of an object, reconstructing, using the scan data, a plurality of medical images under a plurality of different parameters, extracting features, each of the features being extracted from a different one of the plurality of reconstructed medical images and corresponding to one of the plurality of different parameters, and integrating the extracted features to acquire an integrated medical image, wherein the integrated medical image is used as the high-quality image, and each of the parameters is a parameter for optimizing an image quality of a corresponding feature.

* * * * *